(12) United States Patent
Nekimken et al.

(10) Patent No.: US 10,649,529 B1
(45) Date of Patent: May 12, 2020

(54) MODIFICATION OF USER-PERCEIVED FEEDBACK OF AN INPUT DEVICE USING ACOUSTIC OR HAPTIC OUTPUT

(71) Applicant: Apple Inc., Cupertino, CA (US)

(72) Inventors: Kyle J. Nekimken, Cupertino, CA (US); John A. Porcella, Cupertino, CA (US); John S. Camp, Cupertino, CA (US); Michael A. Damianakis, Cupertino, CA (US); Robert L. Coish, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 69 days.

(21) Appl. No.: 15/357,956

(22) Filed: Nov. 21, 2016

Related U.S. Application Data

(60) Provisional application No. 62/355,632, filed on Jun. 28, 2016.

(51) Int. Cl.
*G06F 3/01* (2006.01)
*H01H 13/85* (2006.01)
*G06F 3/02* (2006.01)

(52) U.S. Cl.
CPC .......... *G06F 3/016* (2013.01); *G06F 3/02* (2013.01); *H01H 13/85* (2013.01); *H01H 2215/028* (2013.01); *H01H 2215/03* (2013.01)

(58) Field of Classification Search
CPC ........... G06F 3/016; G06F 3/02; H01H 13/85; H01H 2215/028; H01H 2215/03
See application file for complete search history.

(56) References Cited

U.S. PATENT DOCUMENTS

| | | |
|---|---|---|
| 5,196,745 A | 3/1993 | Trumper et al. |
| 5,293,161 A | 3/1994 | MacDonald et al. |
| 5,424,756 A | 6/1995 | Ho et al. |
| 5,434,549 A | 7/1995 | Hirabayashi et al. |
| 5,436,622 A | 7/1995 | Gutman et al. |
| 5,668,423 A | 9/1997 | You et al. |
| 5,842,967 A | 1/1998 | Kroll |
| 5,739,759 A | 4/1998 | Nakazawa et al. |
| 6,084,319 A | 7/2000 | Kamata et al. |
| 6,342,880 B2 | 1/2002 | Rosenberg et al. |
| 6,373,465 B2 | 4/2002 | Jolly et al. |
| 6,388,789 B1 | 5/2002 | Bernstein |

(Continued)

FOREIGN PATENT DOCUMENTS

| | | |
|---|---|---|
| CN | 101036105 | 9/2007 |
| CN | 101409164 | 4/2009 |

(Continued)

OTHER PUBLICATIONS

U.S. Appl. No. 14/804,930, filed Jul. 21, 2015, pending.

(Continued)

*Primary Examiner* — Afroza Chowdhury
(74) *Attorney, Agent, or Firm* — Brownstein Hyatt Farber Schreck, LLP

(57) ABSTRACT

A feedback or a user-perceived feedback of an input device is modified using one or more output devices. The output devices include one or more speakers and/or one or more actuators. The output (e.g., acoustic and/or haptic) produced using the output device may enhance, amplify, mask, obscure, or cancel an inherent sound or tactile feedback produced by the input device.

20 Claims, 13 Drawing Sheets

(56) References Cited

U.S. PATENT DOCUMENTS

| | | |
|---|---|---|
| 6,438,393 B1 | 8/2002 | Surronen |
| 6,445,093 B1 | 9/2002 | Binnard |
| 6,493,612 B1 | 12/2002 | Bisset et al. |
| 6,693,622 B1 | 2/2004 | Shahoian et al. |
| 6,777,895 B2 | 8/2004 | Shimoda et al. |
| 6,822,635 B2 | 11/2004 | Shahoian |
| 6,864,877 B2 | 3/2005 | Braun et al. |
| 6,952,203 B2 | 10/2005 | Banerjee et al. |
| 6,988,414 B2 | 1/2006 | Ruhrig et al. |
| 7,068,168 B2 | 6/2006 | Girshovich et al. |
| 7,080,271 B2 | 7/2006 | Kardach et al. |
| 7,126,254 B2 | 10/2006 | Nanataki et al. |
| 7,130,664 B1 | 10/2006 | Williams |
| 7,196,688 B2 | 3/2007 | Shena et al. |
| 7,202,851 B2 | 4/2007 | Cunningham et al. |
| 7,234,379 B2 | 6/2007 | Claesson et al. |
| 7,253,350 B2 | 8/2007 | Noro et al. |
| 7,276,907 B2 | 10/2007 | Kitagawa et al. |
| 7,323,959 B2 | 1/2008 | Naka et al. |
| 7,339,572 B2 | 3/2008 | Schena |
| 7,355,305 B2 | 4/2008 | Nakamura et al. |
| 7,360,446 B2 | 4/2008 | Dai et al. |
| 7,370,289 B1 | 5/2008 | Ebert et al. |
| 7,392,066 B2 | 6/2008 | Hapamas |
| 7,423,631 B2 | 9/2008 | Shahoian et al. |
| 7,508,382 B2 | 3/2009 | Denoue et al. |
| 7,570,254 B2 | 8/2009 | Suzuki et al. |
| 7,656,388 B2 | 2/2010 | Schena et al. |
| 7,667,371 B2 | 2/2010 | Sadler et al. |
| 7,667,691 B2 | 2/2010 | Boss et al. |
| 7,675,414 B2 | 3/2010 | Ray |
| 7,710,397 B2 | 5/2010 | Krah et al. |
| 7,710,399 B2 | 5/2010 | Bruneau et al. |
| 7,741,938 B2 | 6/2010 | Kramlich |
| 7,755,605 B2 | 7/2010 | Daniel et al. |
| 7,798,982 B2 | 9/2010 | Zets et al. |
| 7,825,903 B2 | 11/2010 | Anastas et al. |
| 7,855,657 B2 | 12/2010 | Doemens et al. |
| 7,890,863 B2 | 2/2011 | Grant et al. |
| 7,893,922 B2 | 2/2011 | Klinghult et al. |
| 7,904,210 B2 | 3/2011 | Pfau et al. |
| 7,911,328 B2 | 3/2011 | Luden et al. |
| 7,919,945 B2 | 4/2011 | Houston et al. |
| 7,952,261 B2 | 5/2011 | Lipton et al. |
| 7,952,566 B2 | 5/2011 | Poupyrev et al. |
| 7,956,770 B2 | 6/2011 | Klinghult et al. |
| 7,976,230 B2 | 7/2011 | Ryynanen et al. |
| 8,002,089 B2 | 8/2011 | Jasso et al. |
| 8,020,266 B2 | 9/2011 | Ulm et al. |
| 8,040,224 B2 | 10/2011 | Hwang |
| 8,053,688 B2 | 11/2011 | Conzola et al. |
| 8,063,892 B2 | 11/2011 | Shahoian |
| 8,081,156 B2 | 12/2011 | Ruettiger |
| 8,125,453 B2 | 2/2012 | Shahoian et al. |
| 8,154,537 B2 | 4/2012 | Olien et al. |
| 8,174,495 B2 | 5/2012 | Takashima et al. |
| 8,174,512 B2 | 5/2012 | Ramstein et al. |
| 8,169,402 B2 | 6/2012 | Shahoian et al. |
| 8,217,892 B2 | 7/2012 | Meadors |
| 8,217,910 B2 | 7/2012 | Stallings et al. |
| 8,232,494 B2 | 7/2012 | Purcocks |
| 8,248,386 B2 | 8/2012 | Harrison |
| 8,253,686 B2 | 8/2012 | Kyung |
| 8,262,480 B2 | 9/2012 | Cohen et al. |
| 8,265,292 B2 | 9/2012 | Leichter |
| 8,265,308 B2 | 9/2012 | Gitzinger et al. |
| 8,344,834 B2 | 1/2013 | Niiyama |
| 8,345,025 B2 | 1/2013 | Seibert et al. |
| 8,351,104 B2 | 1/2013 | Zaifrani et al. |
| 8,378,797 B2 | 2/2013 | Pance et al. |
| 8,378,965 B2 | 2/2013 | Gregorio et al. |
| 8,384,316 B2 | 2/2013 | Houston et al. |
| 8,390,218 B2 | 3/2013 | Houston et al. |
| 8,390,594 B2 | 3/2013 | Modarres et al. |
| 8,400,027 B2 | 3/2013 | Dong et al. |
| 8,405,618 B2 | 3/2013 | Colgate et al. |
| 8,421,609 B2 | 4/2013 | Kim et al. |
| 8,469,806 B2 | 6/2013 | Grant et al. |
| 8,471,690 B2 | 6/2013 | Hennig et al. |
| 8,493,177 B2 | 7/2013 | Flaherty et al. |
| 8,493,189 B2 | 7/2013 | Suzuki |
| 8,576,171 B2 | 11/2013 | Grant |
| 8,598,750 B2 | 12/2013 | Park |
| 8,598,972 B2 | 12/2013 | Cho et al. |
| 8,604,670 B2 | 12/2013 | Mahameed et al. |
| 8,605,141 B2 | 12/2013 | Dialameh et al. |
| 8,614,431 B2 | 12/2013 | Huppi et al. |
| 8,619,031 B2 | 12/2013 | Hayward |
| 8,624,448 B2 | 1/2014 | Kaiser et al. |
| 8,633,916 B2 | 1/2014 | Bernstein et al. |
| 8,639,485 B2 | 1/2014 | Connacher et al. |
| 8,648,829 B2 | 2/2014 | Shahoian et al. |
| 8,654,524 B2 | 2/2014 | Pance et al. |
| 8,681,130 B2 | 3/2014 | Adhikari |
| 8,717,151 B2 | 5/2014 | Forutanpour et al. |
| 8,730,182 B2 | 5/2014 | Modarres et al. |
| 8,749,495 B2 | 6/2014 | Grant et al. |
| 8,754,759 B2 | 6/2014 | Fadell et al. |
| 8,760,037 B2 | 6/2014 | Eshed et al. |
| 8,773,247 B2 | 7/2014 | Ullrich |
| 8,780,074 B2 | 7/2014 | Castillo et al. |
| 8,797,153 B2 | 8/2014 | Vanhelle et al. |
| 8,803,670 B2 | 8/2014 | Steckel et al. |
| 8,834,390 B2 | 9/2014 | Couvillon |
| 8,836,502 B2 | 9/2014 | Culbert et al. |
| 8,867,757 B1 | 10/2014 | Ooi |
| 8,872,448 B2 | 10/2014 | Boldyrev et al. |
| 8,878,401 B2 | 11/2014 | Lee |
| 8,907,661 B2 | 12/2014 | Maier et al. |
| 8,976,139 B2 | 3/2015 | Koga et al. |
| 8,981,682 B2 | 3/2015 | Delson et al. |
| 8,987,951 B2 | 3/2015 | Park |
| 9,008,730 B2 | 4/2015 | Kim et al. |
| 9,024,738 B2 | 5/2015 | Van Schyndel et al. |
| 9,049,339 B2 | 6/2015 | Muench |
| 9,052,785 B2 | 6/2015 | Horie |
| 9,054,605 B2 | 6/2015 | Jung et al. |
| 9,058,077 B2 | 6/2015 | Lazaridis et al. |
| 9,086,727 B2 | 7/2015 | Tidemand et al. |
| 9,092,056 B2 | 7/2015 | Myers et al. |
| 9,104,285 B2 | 8/2015 | Colgate et al. |
| 9,122,330 B2 | 9/2015 | Bau et al. |
| 9,134,796 B2 | 9/2015 | Lemmons et al. |
| 9,172,669 B2 | 10/2015 | Swink et al. |
| 9,218,727 B2 | 12/2015 | Rothkopf et al. |
| 9,245,704 B2 | 1/2016 | Maharjan et al. |
| 9,256,287 B2 | 2/2016 | Shinozaki et al. |
| 9,274,601 B2 | 3/2016 | Faubert et al. |
| 9,280,205 B2 | 3/2016 | Rosenberg et al. |
| 9,286,907 B2 | 3/2016 | Yang et al. |
| 9,304,587 B2 | 4/2016 | Wright et al. |
| 9,361,018 B2 | 6/2016 | Pasquero et al. |
| 9,396,629 B1 | 7/2016 | Weber et al. |
| 9,430,042 B2 | 8/2016 | Levin |
| 9,436,280 B2 | 9/2016 | Tartz et al. |
| 9,442,570 B2 | 9/2016 | Slonneger |
| 9,448,713 B2 | 9/2016 | Cruz-Hernandez et al. |
| 9,449,476 B2 | 9/2016 | Lynn et al. |
| 9,466,783 B2 | 10/2016 | Olien et al. |
| 9,489,049 B2 | 11/2016 | Li |
| 9,496,777 B2 | 11/2016 | Jung |
| 9,501,149 B2 | 11/2016 | Burnbaum et al. |
| 9,557,857 B2 | 1/2017 | Schediwy |
| 9,829,981 B1 | 11/2017 | Ji |
| 9,875,625 B2 | 1/2018 | Khoshkava et al. |
| 9,904,393 B2 | 2/2018 | Frey et al. |
| 9,927,902 B2 | 3/2018 | Burr et al. |
| 9,940,013 B2 | 4/2018 | Choi et al. |
| 10,110,986 B1 | 10/2018 | Min |
| 10,390,139 B2 | 8/2019 | Biggs |
| 2003/0117132 A1 | 6/2003 | Klinghult |
| 2005/0036603 A1 | 2/2005 | Hughes |
| 2005/0230594 A1 | 10/2005 | Sato et al. |
| 2006/0017691 A1 | 1/2006 | Cruz-Hernandez et al. |

(56) References Cited

U.S. PATENT DOCUMENTS

| | | |
|---|---|---|
| 2006/0209037 A1 | 9/2006 | Wang et al. |
| 2006/0223547 A1 | 10/2006 | Chin et al. |
| 2006/0252463 A1 | 11/2006 | Liao |
| 2007/0106457 A1 | 5/2007 | Rosenberg |
| 2007/0152974 A1 | 7/2007 | Kim et al. |
| 2008/0062145 A1 | 3/2008 | Shahoian |
| 2008/0084384 A1 | 4/2008 | Gregorio et al. |
| 2008/0111791 A1 | 5/2008 | Nikittin |
| 2009/0085879 A1 | 4/2009 | Dai et al. |
| 2009/0115734 A1 | 5/2009 | Fredriksson et al. |
| 2009/0166098 A1 | 7/2009 | Sunder |
| 2009/0167702 A1 | 7/2009 | Nurmi |
| 2009/0167704 A1 | 7/2009 | Terlizzi et al. |
| 2009/0174672 A1 | 7/2009 | Schmidt |
| 2009/0207129 A1 | 8/2009 | Ullrich et al. |
| 2009/0225046 A1 | 9/2009 | Kim et al. |
| 2009/0231271 A1 | 9/2009 | Heubel et al. |
| 2009/0243404 A1 | 10/2009 | Kim et al. |
| 2009/0267892 A1 | 10/2009 | Faubert |
| 2009/0313542 A1 | 12/2009 | Cruz-Hernandez et al. |
| 2010/0116629 A1 | 5/2010 | Borissov et al. |
| 2010/0225600 A1 | 9/2010 | Dai et al. |
| 2010/0231508 A1* | 9/2010 | Cruz-Hernandez ..... G06F 3/016 345/156 |
| 2010/0313425 A1 | 12/2010 | Hawes |
| 2010/0328229 A1 | 12/2010 | Weber et al. |
| 2011/0115754 A1 | 5/2011 | Cruz-Hernandez |
| 2011/0128239 A1 | 6/2011 | Polyakov et al. |
| 2011/0132114 A1 | 6/2011 | Siotis |
| 2011/0205038 A1 | 8/2011 | Drouin et al. |
| 2011/0210834 A1 | 9/2011 | Pasquero et al. |
| 2011/0261021 A1 | 10/2011 | Modarres et al. |
| 2011/0304550 A1* | 12/2011 | Romera Jolliff ........ G06F 3/016 345/168 |
| 2012/0038471 A1 | 2/2012 | Kim et al. |
| 2012/0056825 A1 | 3/2012 | Ramsay et al. |
| 2012/0062491 A1 | 3/2012 | Coni et al. |
| 2012/0113008 A1 | 5/2012 | Makinen et al. |
| 2012/0127071 A1 | 5/2012 | Jitkoff et al. |
| 2012/0127088 A1 | 5/2012 | Pance et al. |
| 2012/0223824 A1 | 9/2012 | Rothkopf |
| 2012/0235942 A1 | 9/2012 | Shahoian |
| 2012/0319827 A1 | 12/2012 | Pance et al. |
| 2012/0327006 A1 | 12/2012 | Israr et al. |
| 2013/0016042 A1 | 1/2013 | Makinen et al. |
| 2013/0044049 A1 | 2/2013 | Biggs et al. |
| 2013/0207793 A1 | 8/2013 | Weaber et al. |
| 2013/0253818 A1 | 9/2013 | Sanders et al. |
| 2013/0278401 A1 | 10/2013 | Flaherty et al. |
| 2014/0015777 A1* | 1/2014 | Park .................. G06F 3/044 345/173 |
| 2014/0062948 A1 | 3/2014 | Lee et al. |
| 2014/0119569 A1* | 5/2014 | Peeler .................. H04B 15/00 381/94.1 |
| 2014/0125470 A1 | 5/2014 | Rosenberg |
| 2014/0168175 A1 | 6/2014 | Mercea et al. |
| 2014/0218853 A1 | 8/2014 | Pance et al. |
| 2014/0274398 A1 | 9/2014 | Grant |
| 2015/0097800 A1 | 4/2015 | Grant et al. |
| 2015/0116205 A1 | 4/2015 | Westerman et al. |
| 2015/0126070 A1 | 5/2015 | Candelore |
| 2015/0130730 A1 | 5/2015 | Harley et al. |
| 2015/0135121 A1 | 5/2015 | Peh et al. |
| 2015/0277562 A1 | 5/2015 | Bard et al. |
| 2015/0205357 A1 | 7/2015 | Virtanen et al. |
| 2015/0234493 A1 | 8/2015 | Parivar et al. |
| 2015/0293592 A1 | 10/2015 | Cheong et al. |
| 2015/0338919 A1 | 11/2015 | Weber et al. |
| 2015/0349619 A1 | 12/2015 | Degner et al. |
| 2016/0011664 A1 | 1/2016 | Silvanto et al. |
| 2016/0098107 A1 | 4/2016 | Morrell et al. |
| 2016/0171767 A1 | 6/2016 | Anderson et al. |
| 2016/0209979 A1 | 7/2016 | Endo et al. |
| 2016/0293829 A1 | 10/2016 | Maharjan et al. |
| 2016/0327911 A1 | 11/2016 | Eim et al. |
| 2016/0328930 A1 | 11/2016 | Weber et al. |
| 2016/0379776 A1* | 12/2016 | Oakley ................. H01H 13/84 200/5 A |
| 2017/0003744 A1 | 1/2017 | Bard et al. |
| 2017/0024010 A1 | 1/2017 | Weinraub |
| 2017/0212591 A1* | 7/2017 | Churikov ................ G06F 3/016 |
| 2017/0249024 A1 | 8/2017 | Jackson et al. |
| 2017/0285843 A1 | 10/2017 | Roberts-Hoffman et al. |
| 2017/0337025 A1 | 11/2017 | Finnan et al. |
| 2018/0014096 A1 | 1/2018 | Miyoshi |
| 2018/0029078 A1 | 2/2018 | Park et al. |
| 2018/0181204 A1 | 6/2018 | Weinraub |
| 2018/0194229 A1 | 7/2018 | Wachinger |

FOREIGN PATENT DOCUMENTS

| | | |
|---|---|---|
| CN | 101663104 | 3/2010 |
| CN | 101872257 | 10/2010 |
| DE | 214030 | 3/1983 |
| EP | 1686776 | 8/2006 |
| EP | 2743798 | 6/2014 |
| JP | 2004129120 | 4/2004 |
| JP | 2004236202 | 8/2004 |
| JP | 2010537279 | 12/2010 |
| JP | 2010540320 | 12/2010 |
| KR | 20050033909 | 4/2005 |
| TW | 2010035805 | 10/2010 |
| WO | WO2002/073587 | 9/2002 |
| WO | WO2006/091494 | 8/2006 |
| WO | WO2007/049253 | 5/2007 |
| WO | WO2007/114631 | 10/2007 |
| WO | WO2009/038862 | 3/2009 |
| WO | WO2010/129892 | 11/2010 |
| WO | WO2013/169303 | 11/2013 |
| WO | WO2014/066516 | 5/2014 |
| WO | WO2016/091944 | 6/2016 |

OTHER PUBLICATIONS

U.S. Appl. No. 15/055,559, filed Feb. 27, 2016, pending.
U.S. Appl. No. 15/166,227, filed May 26, 2016, pending.
U.S. Appl. No. 15/212,890, filed Jul. 18, 2016, pending.
U.S. Appl. No. 15/253,817, filed Aug. 31, 2016, pending.
U.S. Appl. No. 15/263,641, filed Sep. 13, 2016, pending.
U.S. Appl. No. 15/350,592, filed Nov. 14, 2016, pending.
Hasser et al., "Preliminary Evaluation of a Shape-Memory Alloy Tactile Feedback Display," Advances in Robotics, Mechatronics, and Haptic Interfaces, ASME, DSC—vol. 49, pp. 73-80, 1993.
Hill et al., "Real-time Estimation of Human Impedance for Haptic Interfaces," Stanford Telerobotics Laboratory, Department of Mechanical Engineering, Stanford University, 6 pages, at least as early as Sep. 30, 2009.
Lee et al, "Haptic Pen: Tactile Feedback Stylus for Touch Screens," Mitsubishi Electric Research Laboratories, http://wwwlmerl.com, 6 pages, Oct. 2004.
Stein et al., "A process chain for integrating piezoelectric transducers into aluminum die castings to generate smart lightweight structures," Results in Physics 7, pp. 2534-2539, 2017.
Author Unknown, "3D Printed Mini Haptic Actuator," Autodesk, Inc., 16 pages, 2016.

\* cited by examiner

MODIFICATION OF USER-PERCEIVED FEEDBACK OF AN INPUT DEVICE USING ACOUSTIC OR HAPTIC OUTPUT

CROSS-REFERENCE TO RELATED APPLICATION

This application claims the benefit under 35 U.S.C. § 119(e) of U.S. Provisional Patent Application No. 62/355,632, filed on Jun. 28, 2016, and entitled "Modification of User-Perceived Feedback of an Input Device Using Acoustic or Haptic Output," which is incorporated by reference as if fully disclosed herein.

FIELD

The described embodiments relate generally to an input device in an electronic device. More particularly, the present embodiments relate to modifying a feedback or a user-perceived feedback of an input device in an electronic device.

BACKGROUND

Electronic devices can receive user inputs from a variety of different types of input devices, such as a keyboard, a button, a track pad, and a display. Typically, a user experiences a "feel" or feedback associated with the input device when the user provides an input to the input device. For example, a user associates a feedback to a key of a keyboard when the user depresses and releases the key. The sound and feel of the input device are a result of some of the individual mechanical components in the key interacting with one another. This feedback can be based on several factors, such as the force needed to depress the key, the feel of the key as it travels between a rest position and a depressed position, the feel when the key bottoms out (e.g., reaches maximum depression), and/or a sound associated with the depression and/or release of the key.

It is often desirable to reduce the size of an electronic device and minimize machining costs and manufacturing time of such devices. However, as the overall size of the electronic device is reduced, the available space for the input devices is also reduced. Consequently, the internal components of an input device may be reduced in size or eliminated to reduce the overall size, dimension, and/or thickness of the input device. However, the reduction or elimination of components or layer(s) in an input device may negatively affect the feedback of the input device. For example, a keyboard may not provide a user with a desirable amount of tactile response (a "click") when the user depresses a key. Additionally or alternatively, the sounds produced by the actuation of the individual keys in the keyboard may not produce an optimized or ideal user experience.

SUMMARY

Embodiments disclosed herein modify the feedback or user-perceived feedback of an input device with one or more output or sound-generating devices. As used herein, the term "feedback" includes the tactile response or "feel" of the input device and/or the sound(s) produced by the input device during operation of the input device.

In one aspect, an electronic device includes an input device and a sound-generating device. The input device is configured to receive a user input. The input device produces a first pressure wave when the user input is received. In particular, the first pressure wave can be produced before, during, and/or after the actuation of the input device. The sound-generating device is configured to produce a second pressure wave around a time the user input is received. The second pressure wave superimposes on the first pressure wave to produce a third pressure wave that modifies the feedback or the user-perceived feedback of the input device.

In another aspect, a keyboard includes a key and an output device. In some embodiments, the output device is included in a key stack of the key. In other embodiments, the output device is disposed in the keyboard outside of the key stack. The key is configured to receive a key press, and the key produces a first sound when the key press is received. The output device is configured to produce an output around a time the key press is received. In particular, the output can be produced before, during, and/or after the actuation of the key. The output of the output device produces a second sound that interacts with the first sound to modify at least one of a sound or a tactile response of the key.

For example, in some embodiments, a key provides a first feedback output in response to a key press event. An output device is configured to produce a second feedback output in response to the key press event, where the second feedback output modifies the first feedback output. The modification of the first feedback output by the second feedback output can produce a given user-perceived feedback.

In another example, in some embodiments, a key is configured to produce a first feedback output in response to a key press event. An output device is configured to produce a second feedback output in response to the key press event, where the second feedback output modifies at least one of an acoustic or a tactile perception of the key press.

In another aspect, an input device that is configured to receive a user input can include one or more sound-producing components that produce a first sound when the user input is received, and an output device configured to produce a second sound around a time the user input is received. The second sound interacts with the first sound to modify a feedback or a user-perceived feedback of the input device. The second sound can be generated prior to, during, and/or after the user input is received.

For example, in some embodiments an electronic device can include an input device that is configured to receive a user input and to provide a first output in response to the user input. An output device is configured to produce a second output in response to the user input, where the second output modifies or obscures the first output.

In another example, in some embodiments an electronic device can include an input device that is configured to receive a user input and to provide a first user-perceptible output in response to the user input. An output device is configured to produce a second user-perceptible output in response to the user input, where the second user-perceptible output modifies or obscures the first user-perceptible output.

In yet another aspect, a method of operating an electronic device can include determining an identity of a user of the electronic device while the user interacts with the electronic device and detecting a body part approaching or contacting an input device. One or more sounds are produced around a time a user input is received by the input device. The one or more sounds can be generated prior to, during, and/or after the user input is received. The one or more sounds modify a feedback of a user-perceived feedback of the input device.

In another aspect, a method of operating an electronic device includes determining an identity of a location of the electronic device and detecting a body part approaching or contacting an input device. Based on the determined location, one or more sound pressure waves are generated around a time a user input is received by the input device to modify a feedback or a user-perceived feedback of the input device.

In yet another aspect, a method of operating an electronic device includes determining a use condition of the electronic device and retrieving an input device profile associated with the use condition. The use condition is associated with a user interacting with a function, an application program, or a component (e.g., input/output component) of the electronic device. The input device profile can specify, based on the use condition, one or more input devices whose feedback or user-perceived feedback is to be modified, which output device(s) should produce a sound to adjust the feedback or the user-perceived feedback, and how the output device(s) should produce the sound(s) (e.g., the audio file(s) and/or the signal(s) to be received by each input device). A processing device can access the input device profile and cause the specified audio file(s) and/or signal(s) to be transmitted to each specified output device. Based on the input device profile, one or more sounds are produced around a time a user input is received by the input device to modify a feedback or a user-perceived feedback of the input device.

BRIEF DESCRIPTION OF THE DRAWINGS

The disclosure will be readily understood by the following detailed description in conjunction with the accompanying drawings, wherein like reference numerals designate like structural elements, and in which.

Figure 1:
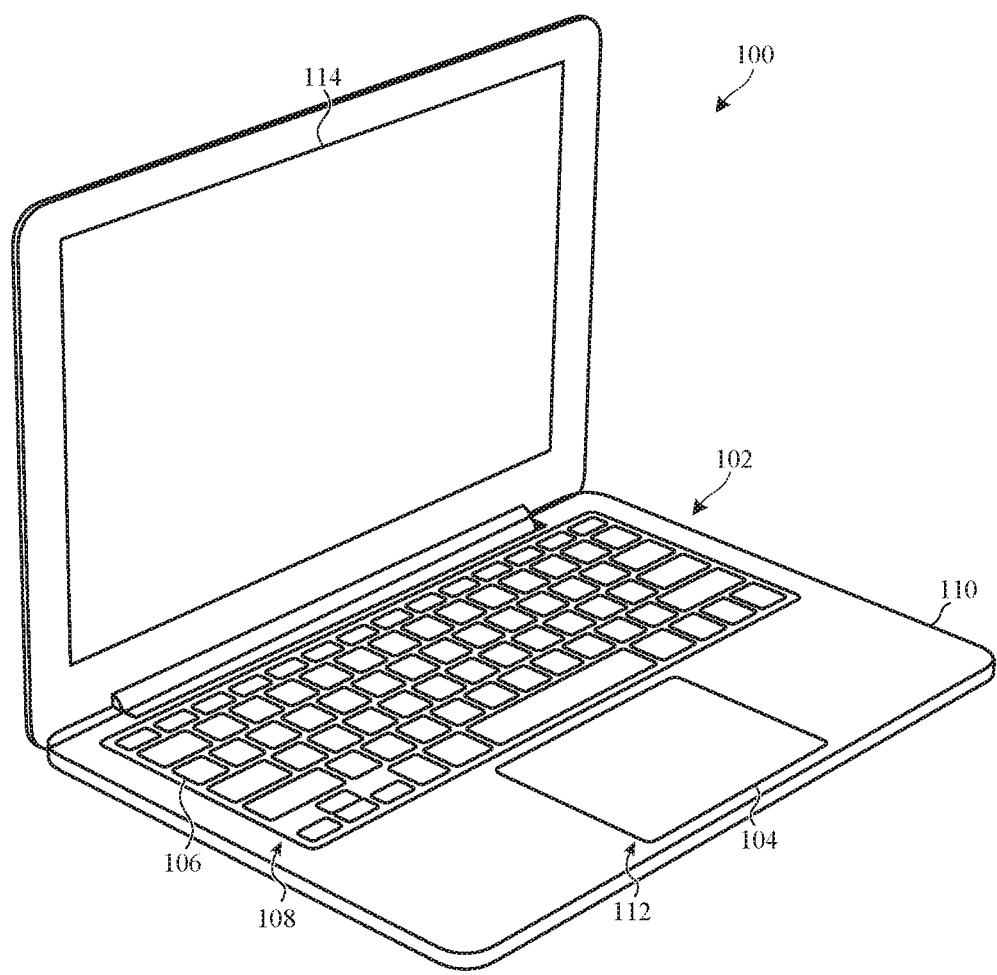
FIG. 1 shows an example electronic device that includes an input device.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

With some input devices, a user associates a feedback to the operation of an input device. The user-perceived feedback can be based on various factors associated with the actuation of an input device including, for example, a sound made by a mechanism of the input device and/or the tactile response or "feel" of the input device when mechanism is actuated. The acoustic and tactile response or feedback of the keys in a keyboard, as they are perceived by the user, are significant factors that affect whether a user likes or dislikes a keyboard. In some cases, the acoustic and tactile responses are a result of the components in each key and/or the interaction of some components with one another. The user may sense or perceive the acoustic and the tactile responses using a combination of touch and acoustic stimuli, and may associate those stimuli as user-perceived feedback of the key actuation.

The user-perceived feedback can be based on several factors, including the force needed to depress the keys, the feel of the keys as they travel between a rest position and a depressed position, the feel when a key bottoms out (e.g., reaches maximum depression), and/or the sounds associated with the depression and/or release of the keys. Acoustic and/or haptic stimuli received around the time the input device is actuated can affect how a person perceives the feedback of the input device. Additionally, in some situations the absence of stimuli affects how the person perceives the feedback of the input device.

The following disclosure relates to modifying a feedback or a user-perceived feedback of an input device using one or more output or sound-generating devices. An output device or a sound-generating device can produce acoustic and/or haptic stimuli around the time an input device is actuated. In particular, an output device can create the acoustic and/or haptic stimuli before, during, and/or after the actuation of the input device. The sound created by the input device and the acoustic and/or haptic stimuli produced by the output or sound-generating device can be heard and/or felt by a user and perceived as a single feedback event or stimulus when the individual sound(s) and stimuli occur within a given time period of each other. The acoustic and/or haptic stimuli can reduce, modify, cancel, or obscure the user-perceived feedback of the input device.

In some embodiments, acoustic and/or haptic output produced by the output device may obscure or mask the feedback produced by the input device. For example, the acoustic and/or haptic output may reduce the perceptibility of the sound or tactile feedback produced by the actuation of the input device. This may help mask or hide an undesirable sound or tactile feedback that is inherent in the feedback produced by the input device. Alternatively, the acoustic and/or haptic output produced by the output device may enhance or amplify an inherent feedback produced by the input device. For example, the acoustic and/or haptic output may improve or increase the perceptibility of inherent or natural feedback produced by the actuation of the input device.

In some embodiments, an input device that is configured to receive a user input produces a first sound pressure wave or sound when the user input is received. To modify the user-perceived feedback of the input device, one or more output devices or sound-generating devices produce a second sound pressure wave or sound around the time the user input is received. The second sound interacts with the first sound to modify the user-perceived feedback of the input device. For example, the second sound pressure wave produced by the sound-generating device(s) may be superimposed on the first sound pressure wave, which results in the user perceiving the feedback of the input device differently. The first and second sounds can combine, and the combined sounds are heard by a user and perceived as one sound when the first and second sounds occur within a given time period of each other. As such, the second sound produced by the output device(s) can occur prior to, during, and/or after the actuation of the input device. The combined sounds affect how a user perceives the feedback of the input device. In particular, the combined sounds can transform or enhance the feedback to a user-preferred feedback.

For example, a first sound or pressure wave can be produced before an input device is actuated and precede or combine with a second sound or pressure wave produced by the input device. The two sounds or the combined sounds (or pressure waves) may be perceived by the user as a third sound or pressure wave that is different from the distinct first and second sounds. The first sound can differ from the second sound or pressure wave in amplitude (e.g., volume or decibels), timing, frequency, and/or phase. For example, the first sound may have a higher decibel level and/or a lower frequency than the second sound.

In another example, a first sound can be produced before an input device is actuated and a second sound generated during or after the input device is actuated. The first sound can precede or combine with a third sound produced by the input device. Similarly, the second sound can follow or combine with the third sound. The first, second, and third sounds (or pressure waves) may be perceived by the user as a fourth sound that differs from the distinct first, second, and third sounds. For example, the first sound may have a higher decibel level and a lower frequency than the third sound and the second sound can have a lower decibel level and occur at the same frequency as the third sound.

For example, in some embodiments, a key in a keyboard is configured to produce a first feedback output in response to a key press event. An output device is configured to produce a second feedback in response to the key press event, where the second feedback modifies the first feedback output or at least one of an acoustic or a tactile perception of the key press.

In some embodiments, the sound produced by the output device(s) cancels or reduces the perceptibility of the sound generated during the actuation of the input device. For example, the undesirable frequencies or sounds produced by an input device during actuation of the input device can be pre-determined. During actuation of the input device, the output device(s) generate one or more sounds that are out of phase with the sounds produced by the input device to attenuate the undesirable sounds in real-time.

These and other embodiments are discussed below with reference to FIGS. 1-12. However, those skilled in the art will readily appreciate that the detailed description given herein with respect to these Figures is for explanatory purposes only and should not be construed as limiting.

FIG. 1 shows an electronic device 100 that incorporates one or more input devices that are associated with user-perceived feedback. The electronic device 100 is depicted as a portable laptop computer, although this is not required. Any suitable electronic device can be used. Example electronic devices include, but are not limited to, a smart phone, a standalone keyboard, a remote control, a standalone track pad, a gaming device, a wearable electronic device such as a health monitoring device or a watch, a portable media player, and a kiosk.

A keyboard 102 and/or a track pad 104 may each have an associated user-perceived feedback. With respect to the keyboard 102, the keys 106 at least partially extend through an aperture 108 defined in a housing 110 of the electronic device 100. Each key 106 may depress at least partially into the aperture 108 when a user presses the key 106. Typically, a user associates a feedback to a key 106 that can be based on several factors, such as the force needed to depress the key 106, the feel of the key 106 as it travels between a rest position and a depressed position, the feel when the key 106 bottoms out (e.g., reaches maximum depression), and/or the sound associated with the depression and/or release of the key 106. These factors, as well as other possible interactions and sounds, can produce an acoustic response and/or a tactile response associated with the depression and/or release of the key 106, which is perceived as feedback by the user.

The track pad 104 is disposed in an aperture 112 defined in the housing 110 of the electronic device 100. At least a portion of the track pad 104 depresses or deflects when a user presses the track pad 104. For example, a user may depress or deflect a portion of the track pad 104 to perform a "click" or a "double click" that selects an icon displayed on the display 114. Additionally or alternatively, in some embodiments a user can apply a force to a portion of the track pad 104 to submit a force input for an application or function.

Similar to the keys 106, a user associates a feedback with the track pad 104 that can be based on several factors, such as the force needed to depress or deflect a portion of the track pad 104, the feel of the track pad 104 when it moves, the feel when the track pad 104 reaches maximum depression or deflection, and/or the sound associated with the depression, deflection, and/or release of the track pad 104. These factors, as well as other possible interactions and sounds, can produce an acoustic response and/or a tactile response associated with the depression and/or release of the track pad 104, which is perceived as feedback by the user.

As will be discussed in more detail later, one or more output devices (see FIG. 3) can be used to produce an output (e.g., acoustic and/or haptic output) that together with the feedback of the key 106 and/or the track pad 104 modifies, enhances, obscures, or reduces the feedback of the key 106 and/or the trackpad 104 or modifies the user-perceived feedback associated with the key 106 and/or the track pad 104.

As discussed earlier, the following disclosure relates to modifying a feedback or a user-perceived feedback of an input device using one or more sound-generating devices or output devices. The described embodiments are directed at a key in the keyboard (e.g., key 106). However, the disclosed techniques to modify a user-perceived feedback of an input device can be used with other types of input devices, such as the track pad 104, an input button, a switch, a display, and/or a flexible portion of a housing.

Figure 2:
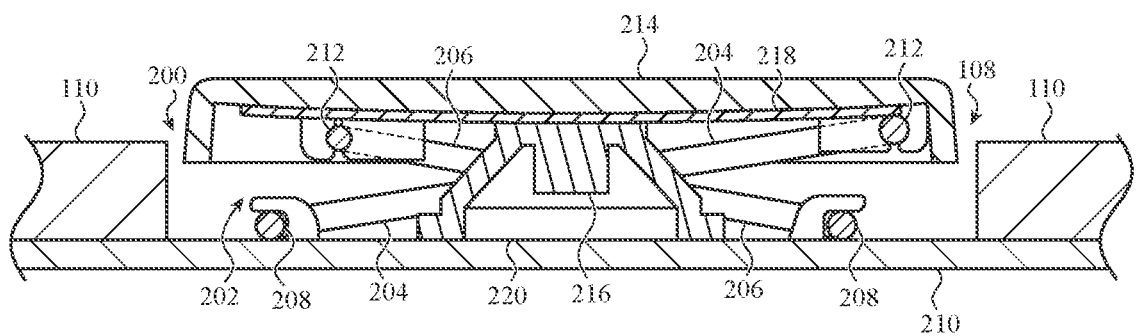
FIG. 2 shows a cross-sectional view of an example key in a keyboard.

In the illustrated embodiment of FIG. 1, a structure associated with the key 106 is disposed at least partially within the aperture 108. This structure, referred to as a "key stack," can include a keycap, a key mechanism, a compressible dome, and electronic switch circuitry. FIG. 2 shows one example of a key stack that is suitable for use with a key in a keyboard. The key stack 200 is depicted in a neutral or rest position (e.g., the key is not pressed by a user). The key stack 200 at least partially extends through an aperture 108 that is defined in the housing 110 of an electronic device. A key mechanism 202 is configured to move when the key is depressed or released. Any suitable key mechanism can be used. In the illustrated embodiment, the key mechanism 202 is shown as a scissor-style key mechanism that includes two cross-structures 204, 206 coupled together by a hinge. First ends 208 of the cross-structures 204, 206 are slidably attached to a base 210 and second ends 212 are rotatably attached to the underside of a key cap 214. Other embodiments can use a different type of a key mechanism. For example, a key mechanism that includes a butterfly hinge may be used.

A compressible dome 216 is disposed between the key cap 214 and the base 210. In some embodiments, the compressible dome 216 is formed from an elastomeric material, although this is not required. In some embodiments, a compressible dome can be formed with a metal.

When a user presses the key cap 214, the key mechanism 202 collapses and the compressible dome 216 compresses as the key travels between the rest position and a depressed position. In particular, the second ends 212 of the two cross-structures 204, 206 rotate or pivot while the first ends 208 slide along the base 210 during the travel. When the user presses with a sufficient amount of force, the compressible dome 216 collapses and activates the electronic switch circuitry included in the base 210.

At least some of the components within the key stack 200 can interact with one another to produce sounds during actuation of the key (e.g., depression and/or release). For example, sound can be created when a user's finger contacts the key cap 214. Sound may also be generated by the first ends 208 of the cross-structures 204, 206 sliding along the base 210. The compressible dome 216 can produce one or more sounds as it compresses and/or releases. Additionally or alternatively, the compressible dome 216 may generate sound(s) when the compressible dome 216 collapses onto the base 210. Collectively, these sounds form one or more sounds or pressure waves that are perceived by a user as a feedback of the key.

Other factors that can contribute to the feedback of the key are the force needed to depress the key (e.g., 206, 206, 214 and 216 in FIG. 2), the feel of the key as it travels between a rest position and a depressed position, and/or the feel when the key bottoms out (e.g., reaches maximum depression). Additionally or alternatively, the mechanical interaction of pins and/or joints in the key stack 200 may produce acoustic and/or tactile responses that contribute to the user-perceived feedback of the key stack 200 (see FIG. 2).

In the illustrated embodiment, a sensor 218 and an output device 220 are included in the key stack 200 and used to modify the user-perceived feedback of the key. The sensor 218 is configured to detect an object (e.g., finger) approaching and/or contacting the key cap 214. Data or signals from the sensor 218 can be used to trigger or activate the output device 220.

The sensor 218 is shown adjacent to or attached to the underside of the key cap 214, although this is not required. Any suitable type of sensor may be used. For example, the sensor 218 may be a proximity sensor that is positioned below or adjacent the key cap 214. Alternatively, the sensor 218 can be discrete proximity sensors that are positioned at different locations around and/or below the key cap 214 or within the key stack 200.

In another example, the sensor 218 may be a touch sensor that is configured to detect a finger approaching and/or contacting the key cap 214. The touch sensor may span the underside of the key cap 214. Alternatively, discrete touch sensors can be positioned at different locations below the key cap 214 and/or within the key stack 200.

The sensor 218 can employ any suitable type of sensing technology. For example, the sensor 218 may be an inductive or capacitive proximity or touch sensor. Alternatively, the sensor 218 can be a photosensor that detects the absence or the reflection of light. For example, the key cap 214 may include an opening that extends through the key cap 214. A photosensor sensor can be positioned within the key stack 200 (e.g., below the opening) to detect light passing through the opening. A finger may cover the opening when the finger approaches and/or contacts the key cap 214, and the reduction or absence of light may be detected by the photosensor.

As described earlier, signals or data from the sensor 218 can be used to trigger or activate the output device 220. The output device 220 is configured to produce one or more sounds around the time the key is actuated. The sound(s) produced by the key and the sound(s) produced by the output device 220 can combine, and the combined sound may be heard by the user and associated with the actuation of the input device when the two sounds occur within a given time period of each other. As such, the sound(s) produced by the output device 220 can occur prior to, during, and/or after the actuation of the key.

Any suitable output device or sound-generating device can be used. For example, in one embodiment the sound-generating device is an acoustic component such as a speaker that outputs a sound (e.g., an acoustic output). In another embodiment, the sound-generating device is an actuator that moves one or more components to produce a sound. Any suitable actuator can be used. For example, an electromagnetic actuator can move one or more components (e.g., a magnet) in response to an electromagnetic field generated by passing an electrical current through a coil. The movement of the component(s) varies based on a direction of the electrical current through the coil and the amount of time the electrical current passes through the coil. The movement can produce a force (e.g., an impulse or an impulse force) and/or a vibration that may or may not be detectable by the user. An impulse may include a single pulse of energy and a vibration may include a series or pulses or oscillating movement. Thus, the actuator can produce a variety of sounds based on the different movements of the component(s).

Figure 3:
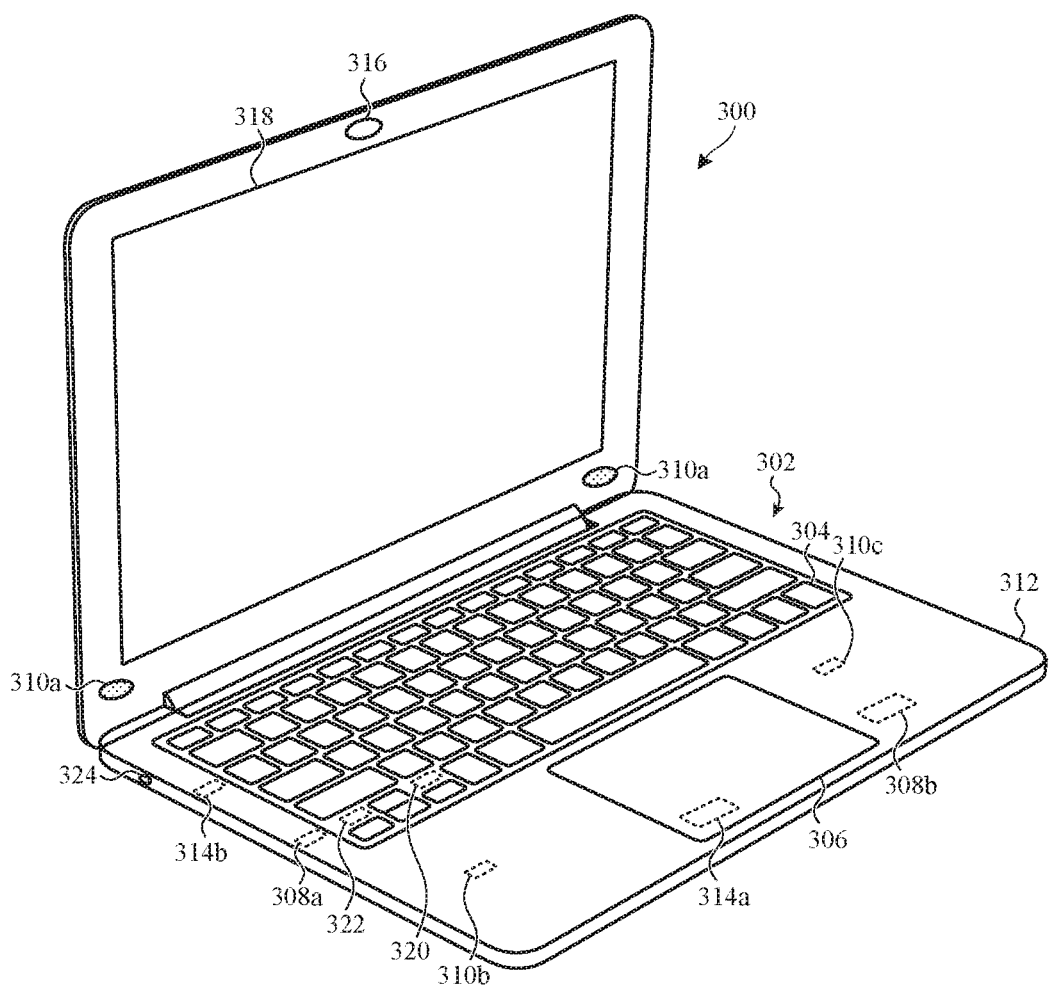
FIG. 3 shows an example electronic device that includes an input device having an associated feedback and an output device configured to modify the feedback.

FIG. 3 shows an example electronic device that includes an input device having an associated user-perceived feedback and an output device configured to modify the user-perceived feedback. As described earlier, the keyboard 302, the keys 304, and/or the track pad 306 are input devices that can have an associated user-perceived feedback. In some embodiments, an electronic device 300 can include one or more output devices 308a-b, 310a-c configured to produce one or more sounds or acoustic output that modify the user-perceived feedback of an input device. The one or more output devices 308a-b, 310a-c can be situated substantially anywhere in the electronic device 300. As shown in FIG. 3, the output device(s) 308a-b, 310a-c may be disposed in the housing 312 of the electronic device 300 independent of (separate from) an input device.

For example, the output device 308a and/or 308b may be configured as an actuator. One or more actuators can be positioned substantially anywhere in the housing 312. As described earlier, an electromagnetic actuator moves one or more components (e.g. a magnet) in response to a generated electromagnetic field. The movement of the component(s) can produce one or more sounds. For example, the moving component can produce sounds as the moving component moves or slides in one or more directions. Additionally, the moving component may generate sounds when the moving component collides or impacts a housing or a frame that is positioned adjacent to the moving component.

In some embodiments, the actuator(s) may create a haptic output that may not be detectable by the user. The sound(s) and/or the haptic output can combine with acoustic and/or tactile response of the keys 304 and/or the track pad 306 to modify, enhance, obscure, or cancel the user-perceived feedback of the input device. Example actuators are shown and described in conjunction with FIGS. 10 and 11.

In the illustrated embodiment, one output device 308a (e.g., an actuator) is positioned adjacent the keyboard 302 to produce sound(s) that modify the user-perceived feedback of the keys 304 in the keyboard 302 and/or the track pad 306 when one or more keys 304 or the track pad 306 are actuated by a user. Additionally or alternatively, an output device 308b (e.g., an actuator) is situated adjacent the track pad 306 to produce sound(s) around the time an input device is actuated to modify the user-perceived feedback of the input device (e.g., track pad 306 and/or the keys 304).

In some embodiments, a different type of output device 310a, 310b, and/or 310c can be included in the housing 312 to modify, enhance, obscure, or cancel the user-perceived feedback of the track pad 306 and/or the keys 304 in the keyboard 302. The output device 310a, 310b, and/or 310c may be configured as a speaker that outputs an audio signal or other acoustic output based on one or more audio files stored in a memory (see FIG. 12). The acoustic output can be output around the time an input device (e.g., a key 304 or track pad 306) is actuated to modify the user-perceived feedback of the input device. The acoustic output can combine with the acoustic and/or tactile response of the keys 304 and/or the track pad 306 to modify, enhance, obscure, or cancel the user-perceived feedback of the input device.

In the illustrated embodiment, two output devices 310a (e.g., speakers) are positioned adjacent the keyboard 302 to produce sound(s) that modify the user-perceived feedback of the keys 304 in the keyboard 302 and/or the track pad 306 when one or more keys 304 or the track pad 306 are actuated by a user. Additionally or alternatively, an output device 310b and/or 310c (e.g., actuator) is situated adjacent the track pad 306 to produce sound(s) around the time an input device is actuated to modify the user-perceived feedback of the input device (e.g., track pad 306 and/or the keys 304).

As described earlier, the sound produced by an input device and the sound produced by an output device can combine, and the combined sounds may be heard by a user when the two sounds occur within a given time period of each other. Consequently, an output device 308a-b, 310a-c can generate a sound prior to, during, or after the actuation of an input device.

In some embodiments, data from one or more sensors 314a-b, 316 can be used to trigger at least one output device 308a-b, 310a-c. For example, one or more sensors may detect a finger approaching an input device and the data from the sensor(s) 314a-b, 316 can trigger or activate an output device to generate a sound prior to, during, or after the actuation of the input device. Additionally or alternatively, one or more sensors 314a-b, 316 may detect a finger contacting an input device and the signals from the sensor(s) 314a-b, 316 can activate an output device to generate one or more sounds during or after the actuation of the input device.

The sensor(s) 314a-b, 316 can be situated substantially anywhere in the electronic device 300. In the illustrated embodiment, the one or more sensors 314a-b, 316 are disposed in the housing 312 of the electronic device 300 independent of (separate from) an input device. The sensor(s) 314a-b, 316 may be any suitable sensor configured to sense an object at a distance (e.g., over or on a key 304 or the track pad 306). Such sensors include, but are not limited to proximity, presence-sensing, photoelectric, and/or image sensors.

For example, in the illustrated embodiment the sensor 314a can be configured as one or more proximity sensors that detect a finger approaching and/or contacting the track pad 306. The one or more proximity sensors can be situated at any suitable location within or adjacent the track pad 306.

Additionally or alternatively, in another example the sensor 314b may be one or more presence-sensing sensors that detect one or more fingers approaching or contacting the keyboard 302 (e.g., one or more keys 304). The one or more presence-sensing sensors can be located at any suitable position in the electronic device 300. In the illustrated embodiment, a presence-sensing sensor 314b is disposed adjacent the keyboard 302.

In another example embodiment, a sensor 316 can be one or more image sensors that are positioned adjacent the display 318 to capture images of the keyboard 302 and/or the track pad 306. The images may be analyzed to detect one or more fingers approaching and/or contacting the keyboard 302 (e.g., keys 304) and/or the track pad 306. In other embodiments, one or more image sensors can be located at any suitable position in the electronic device 300.

In some embodiments, one or more sensors 320 and/or one or more output devices 322 can be included in the keyboard 302 outside of a key stack of a key 304. In such embodiments, the sensor(s) 320 may detect a finger approaching and/or contacting the keyboard 302. Signals or data from the sensor(s) 320 can activate the output device(s) to produce sound prior to, during, and/or after the actuation of the keys 304 in the keyboard 302.

In some embodiments, one or more sensors 324 can be used to detect a characteristic of the environment in which the electronic device 300 is operating within. The data from the sensor(s) 324 may be used to determine a location of the electronic device or the level of sound in the environment in which the electronic device is situated. For example, the sensor(s) 324 may be a microphone that collects audio data of the location or the sound level. Data from the sensor(s) 324 can be used to activate and/or modify the operation of an output device to generate a sound based on the actuation of an input device.

Additionally or alternatively, one of the sensors 314a-b, 316 can be used to determine a location of the electronic device. In one non-limiting example, an image sensor (e.g., sensor 316) may capture one or more images that are analyzed to determine the location of the electronic device 300. As will be described in more detail later in conjunction with FIG. 6, a profile associated with a location can be retrieved and used to select which output devices will be used to produce sounds and to control the operations of the output devices.

Figure 4:
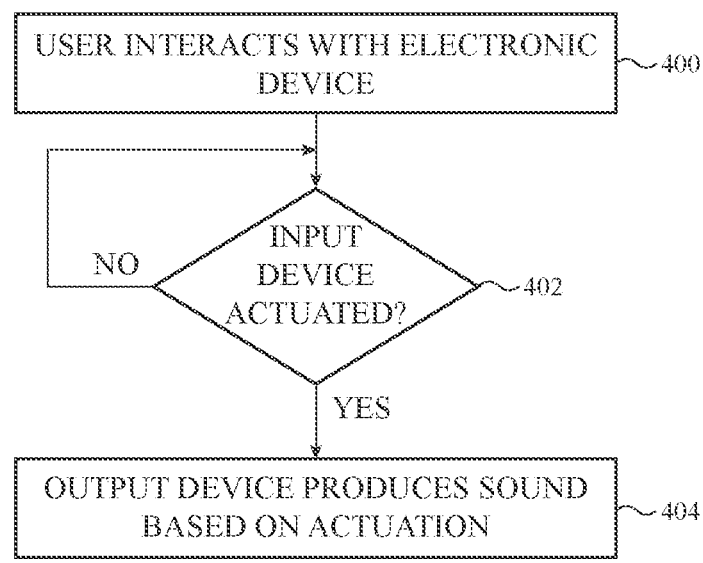
FIG. 4 shows a flowchart of a first method of modifying a feedback of an input device.

FIG. 4 shows a flowchart of a first method of modifying a feedback of an input device. Initially, a user interacts with an electronic device (block 400). As the user interacts with the electronic device, a determination is made at block 402 as to whether an input device is actuated. If not, the process waits at block 402. When an input device is actuated, the method continues at block 404 where one or more output devices or sound-generating devices produce an acoustic and/or haptic stimuli (e.g., one or more sounds) based on the actuation of the input device. The acoustic and/or haptic stimuli produced by the one or more output devices can precede, follow, or combine with the sound(s) produced by the input device during actuation to modify, enhance, obscure, or cancel a user-perceived feedback of the input device.

As discussed earlier, any suitable output device or sound-generating device can be used. As one example, the sound-generating device is an acoustic device such as a speaker that outputs an audio signal or other acoustic output. The acoustic output precedes, follows, or combines with the sound(s) produced by the input device during actuation to modify, enhance, obscure, or cancel a user-perceived feedback of the input device.

In another example, the output device is an actuator that produces haptic output based on the actuation of the input device. The haptic output may be movement, a force, and/or a vibration based on the actuation of the input device. The actuator can create one or more sounds while producing the movement, force, and/or vibrations. The sound(s) and/or haptic stimuli produced by the actuator precedes, follows, or combines with the sound(s) produced by the input device during actuation to modify, enhance, obscure, or cancel a user-perceived feedback of the input device.

In some embodiments, the movement, force and/or vibrations are not detectable by a user. For example, the haptic output can be an impulse caused by a first component impacting or striking a second component in the electronic device. A user may not feel or detect the impulse, but the user can hear the sound produced when the first component impacts the second component.

Alternatively, the movement, force and/or vibrations can be detectable by a user and may be used to modify the tactile "feel" or feedback of an input device, such as a key in a keyboard, a button, and any other input device that a user touches or presses. For example, a haptic output can be an impulse caused by a first component impacting or striking a second component in the electronic device. A user may feel or detect the impulse, which causes the user to perceive a modified tactile feedback of the input device.

Figure 5:
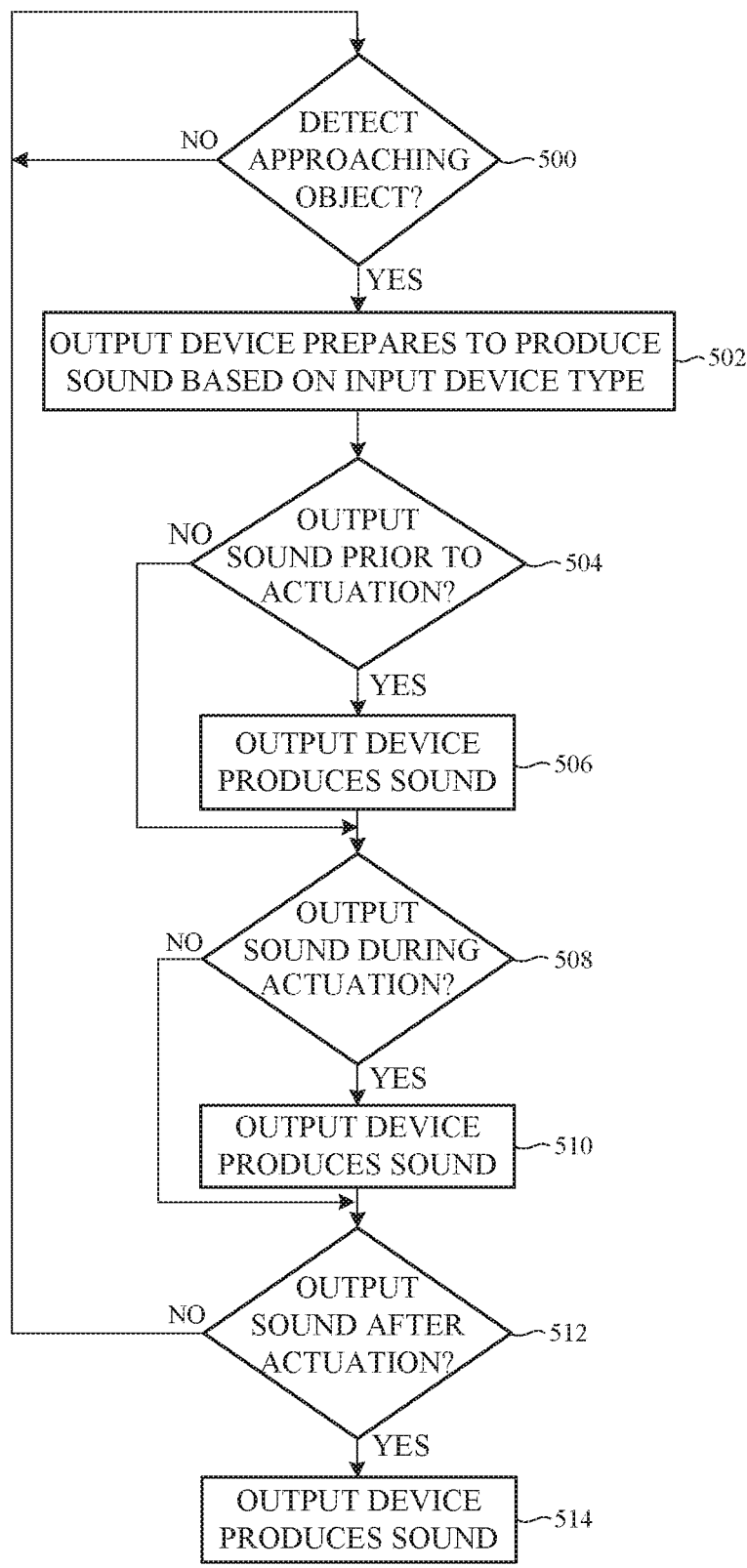
FIG. 5 shows a flowchart of a second method of modifying a feedback of an input device.

FIG. 5 shows a flowchart of a second method of modifying a feedback of an input device. The acoustic and/or tactile feedback of the input device can be modified by one or more output devices that produce one or more acoustic and/or haptic stimuli to modify, enhance, obscure, or cancel a feedback or a user-perceived feedback of the input device. As discussed earlier, the output device(s) can generate an output before, during, and/or after actuation of the input device. The sound(s) created by the input device and the acoustic and/or haptic stimuli produced by the output or sound-generating device can follow one another or combine. A user may hear and/or feel the sound(s), the acoustic stimulus, and/or the haptic stimulus and perceive the individual events as a single feedback event or stimulus when the individual sound(s) and stimuli occur within a given time period of each other.

Initially, a determination is made at block 500 as to whether an object approaching the input device is detected. Example objects include a finger, a stylus, or other pointing device. If not, the process waits at block 500. When an object is approaching an input device and the approaching object is detected, the method passes to block 502 where one or more output devices prepare to generate an acoustic stimulus and/or a haptic stimulus based on the type of input device the object is approaching. For example, one or more output devices that are within a key, within a keyboard, and/or adjacent the keyboard may be used when an object is approaching the key in the keyboard.

Next, as shown in block 504, a determination is made as to whether the output device(s) that prepared at block 502 are to produce sound(s) prior to the actuation of the input device. If not, the process passes to block 508. When sound is to be produced prior to the actuation of the input device, the output device(s) that prepared at block 502 generate the acoustic and/or haptic stimuli at block 506 to modify the feedback or the user-perceived feedback of the input device.

If the output device(s) that prepared at block 502 generate the haptic and/or acoustic stimuli at block 506, or if it is determined the output device(s) will not produce an output at block 504, the method passes to block 508. At block 508 a determination is made as to whether the output device(s) that prepared at block 502 are to produce acoustic and/or haptic stimuli during the actuation of the input device. If not, the process passes to block 512. When acoustic and/or haptic stimuli is to be produced during actuation of the input device, the output device(s) that prepared at block 502 generate the acoustic and/or haptic output at block 510 to modify the feedback or the user-perceived feedback of the input device. The acoustic and/or haptic stimuli can be the same or different sound(s) that were produced at block 506.

If the output device(s) that prepared at block 502 generate the haptic and/or acoustic stimuli at block 510, or if it is determined the output device(s) will not produce an output at block 508, the method passes to block 512. At block 512 a determination is made as to whether the output device(s) that prepared at block 502 are to produce one or more outputs after actuation of the input device. If not, the process returns to block 500. When acoustic and/or haptic stimuli is to be produced after actuation of the input device, the output device(s) that prepared at block 502 generate the output(s) at block 514 to modify the feedback or the user-perceived feedback of the input device. The acoustic and/or haptic stimuli can be the same or different output(s) that were produced at block 506 and/or at block 510.

In some embodiments, the one or more sounds or haptic outputs produced by the output device may precede, follow, or combine with the sound(s) generated by the input device, which results in the user perceiving the feedback of the input device differently. The acoustic and/or haptic stimuli and the input device sound(s) are heard and/or felt by a user and associated with the input device as feedback when the two sounds occur within a given time period of each other.

In other embodiments, the one or more outputs produced by the output device(s) cancels the sound(s) (or some of the sound) generated during the actuation of the input device. For example, the undesirable frequencies or sounds produced by an input device during actuation of the input device can be pre-determined. During actuation of the input device, the output device(s) generate one or more sounds that are out of phase with the sounds produced by the input device to attenuate the undesirable sounds in real-time.

Figure 6:
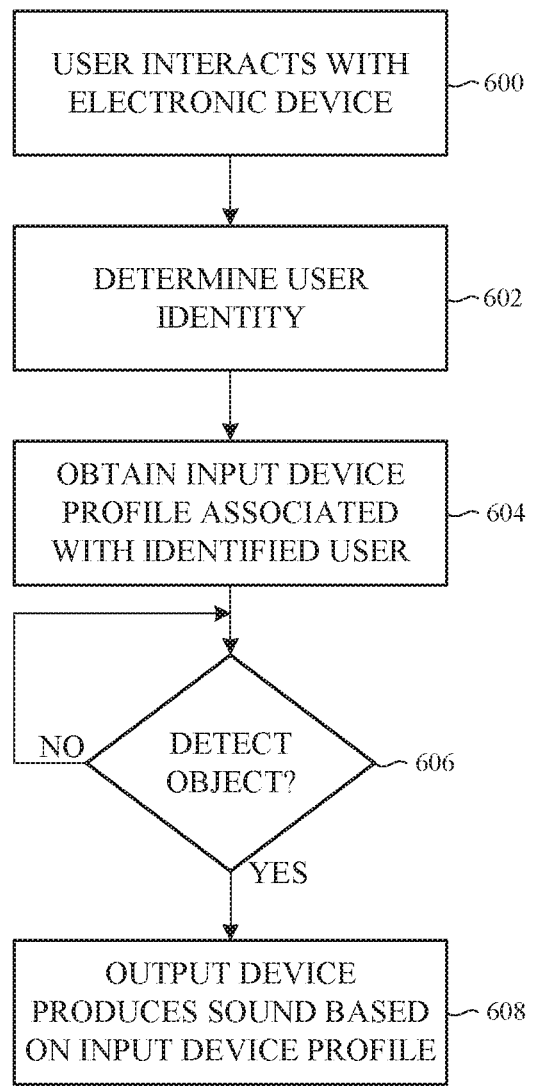
FIG. 6 shows a flowchart of a third method of modifying a feedback of an input device.

FIG. 6 shows a flowchart of a third method of modifying a feedback of an input device. In some embodiments, multiple users can use the same electronic device. In such embodiments, an identity of a user can be determined based on how the user interacts with the electronic device and/or an input device. Based on the identified user, an input device profile that is associated with the user can be obtained. The input device profile lists specific input devices in which the feedback or the user-perceived feedback is to be modified. For those input devices, the input device profile can specify which output device(s) are to be used to modify the feedback or the user-perceived feedback of the input devices. In other words, the input device profile allows a user to customize the feedback or the user-perceived feedback for one or more input devices.

The process of FIG. 6 begins with a user interacting with an electronic device (block 600). As the user interacts with the electronic device, the identity of the user may be determined based on one or more characteristics of the user's interaction with the electronic device (block 602).

For example, when a user is typing on a keyboard, one or more characteristics of the typing can be used to identify the user. Characteristics such as the typing speed, the force applied to the keys, and/or the manner of typing (e.g., pauses in between key strikes) may be used to identify the user. Alternatively, the applications accessed by the user, and the manner in which the user interacts with the applications can be used to determine the user's identity.

In some embodiments, one or more sensors can be used to determine the identity of the user. For example, a biometric sensor can capture biometric data as the user interacts with the electronic device. The biometric data may be used to identify the user. In another example, an image sensor can capture an image of a user and the user may be identified based on an analysis of the image (e.g., facial recognition program).

In other embodiments, an identifier associated with the user can be used to determine the identity of the user. For example, a password or a pin that a user enters to access the electronic device, a website, or an application may be used to identify the user. Alternatively, a user may enter his or her identity into the electronic device (e.g., via a software program).

Next, as shown in block 604, an input device profile associated with the identified user is obtained. As described earlier, the input device profile can specify one or more input devices whose feedback or user-perceived feedback is to be modified, which output device(s) should produce acoustic and/or haptic stimuli to adjust the feedback or the user-perceived feedback, and how the output device(s) should produce the output(s) (e.g., the audio file(s) and/or the signal(s) to be received by each input device). A processing device can access the input device profile and cause the specified audio file(s) and/or signal(s) to be transmitted to each specified output device.

A determination is then made at block 606 as to whether an object (e.g., a finger or stylus) is detected approaching and/or contacting an input device. If not, the process waits at block 606. When an object is approaching and/or contacting an input device, the method passes to block 608 where one or more output devices generate acoustic and/or haptic stimuli based on the input device profile. The acoustic and/or haptic stimuli modifies the feedback or the user-perceived feedback of the input device. In some embodiments, block 608 can be replaced with one or more of the blocks 504, 506, 508, 510, 512, and 514 in FIG. 5 when an object is detected approaching and/or contacting the input device.

In some embodiments, a first user may prefer the feedback of an input device to be greater or more noticeable (perceivable) than a second user of the same input device. In such embodiments, a haptic stimulus can be increased for the first user and lowered for the second user. Additionally or alternatively, an acoustic stimulus can be lowered for the first user and not produced for the second user.

Figure 7:
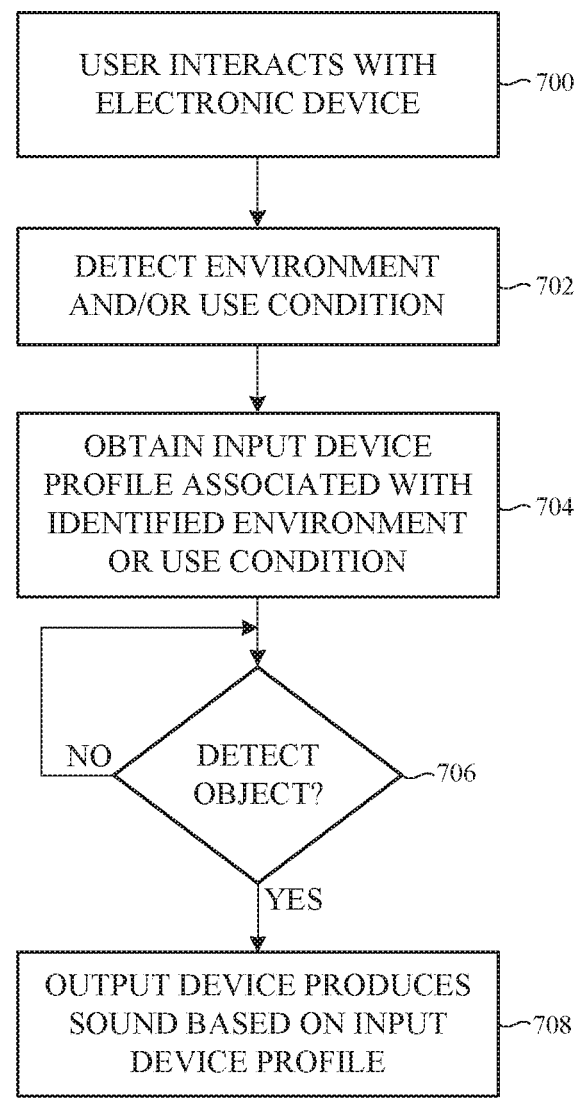
FIG. 7 shows a flowchart of a fourth method of modifying a feedback of an input device.

FIG. 7 shows a flowchart of a fourth method of modifying a feedback of an input device. In some embodiments, the modification of the feedback or the user-perceived feedback of an input device can be based on the location or environment of the electronic device, or on a use condition of the electronic device. Different locations or environments can be associated with different ambient sounds, and these sounds can affect the feedback or the user-perceived feedback of an electronic device.

Initially, a user interacts with an electronic device at block 700. As the user interacts with the electronic device, one or more characteristics of the surrounding environment and/or the use condition of the electronic device may be determined (block 702). For example, the environment may be a quiet environment, such as in a library, a conference room, or a home office. Alternatively, the environment can be a noisier environment, such as in a coffee shop, a manufacturing facility, or an airport terminal. The environment sounds can be detected with one or more sensors in the electronic device. For example, a microphone can capture audio of the environment.

The identity of the environment can be determined using a variety of techniques. For example, one or more sensors may be used to determine the location. An image sensor can capture an image of a location and the location may be identified based on an analysis of the image (e.g., image recognition program). Additionally or alternatively, a microphone may capture sounds of the environment and a processing device can analyze the audio data to determine a location's identity. In some embodiments, a navigation sensor, such as a global positioning sensor, can be used to determine the identity of a location.

In other embodiments, a user may enter an identity of the environment or location into the electronic device (e.g., via a software program) to identify the location.

Additionally or alternatively, the components, application programs, and/or functions of an electronic device that a user is interacting with ("use condition") can be determined. For example, the user may have headphones plugged into a headset port. The user may be using headphones because he or she is in a noisier environment, listening to audio, or watching a video. Alternatively, a user may be using an assistive technology that provides additional accessibility to an individual who has physical or cognitive challenges. Example assistive technologies include, but are not limited to, software or hardware text-to-speech or speech synthesizers, a modified keyboard, a speech or voice recognition software application program, a screen reader, or a TTY/TDD conversion modem.

Next, as shown in block 704, an input device profile associated with the identified location or use condition is obtained. The input device profile can specify, based on the location and/or use condition, one or more input devices whose feedback or user-perceived feedback is to be modified, which output device(s) should produce haptic and/or acoustic stimuli to adjust the feedback or the user-perceived feedback of the input device, and how the output device(s) should produce the acoustic and/or haptic stimuli. A processing device can access the input device profile and cause the specified audio file(s) and/or signal(s) to be transmitted to each specified output device.

A determination is then made at block 706 as to whether an object (e.g., finger or stylus) is detected approaching and/or contacting an input device. If not, the process waits at block 706. When an object is approaching and/or contacting an input device, the method passes to block 708 where one or more output devices generate acoustic and/or haptic stimuli to modify the feedback or the user-perceived feedback of the input device. As described earlier, a processing device can access the input device profile and cause appropriate inputs to be received by the specified output device(s). For example, specified audio file(s) and/or signal(s) may be transmitted to each specified output device.

In some embodiments, a haptic stimulus may be increased when the user is in a coffee shop or a manufacturing site. The increased haptic stimulus may be felt by a user and/or produce a sound that is heard by the user. The increased haptic stimulus, along with the noisy environment, can cause the perceived feedback of an input device to remain substantially consistent as perceived by the user.

Alternatively, a haptic stimulus can be increased when the user is wearing ear plugs. In such situations, a user may want his or her perceived feedback of an input device (e.g., the feel of the keys in a keyboard) to remain substantially consistent. The increased haptic stimulus, along with the absence of sound produced by the ear plugs, can maintain the perceived feedback of the input device at a regular or expected level of feedback.

Thus, in some environments, it may be more difficult for a user to detect a user-perceived acoustic feedback of an input device. In such environments, the acoustic and/or haptic stimuli produced by an output device can be modified (e.g., increased) to improve the perceptibility of the user-perceived acoustic feedback. Similarly, in other environments, it may be more difficult for a user to detect a user-perceived haptic feedback of an input device. Accordingly, the acoustic and/or haptic stimuli produced by an output device can be modified (e.g., increased) to improve the perceptibility of the user-perceived haptic feedback.

Thus, the acoustic and/or haptic stimuli produced by an output device can be adaptive, where the acoustic and/or haptic stimuli are selected as a function of a user preference and/or environmental conditions (e.g., background noise and/or vibration). In some implementations, the acoustic and/or haptic stimuli can be adaptive based on how a user is using an input device. For example, if a user is typing on a keyboard with a higher level of force (e.g., more forceful presses on the keys of the keyboard), the acoustic and/or haptic stimuli can be increased to modify the user-perceived feedback of the keyboard.

Additionally, as described earlier, an electronic device can be configured to detect one or more characteristics of the environment in which an electronic device is being used. As described earlier, the electronic device can include one or more sensors coupled to a processing device. The sensor(s) can be configured to detect the characteristic(s) of the environment, such as sound, vibration, temperature, and the like. For example, signals received from an accelerometer can be used by a processing device to determine the electronic device is moving (e.g., based on detected vibrations). Additionally, signals from a microphone may be used by the processing device to determine a location of the electronic device (e.g., based on sounds). As example situations, the signals from the accelerometer and the microphone can be used to determine the electronic device is on a train or bus. Alternatively, the signals from the accelerometer and the microphone can be used to determine the user is wearing the electronic device while the user is moving (e.g., running). Based on that determination, an acoustic stimulus of an output device can be produced to enhance the acoustic feedback of the electronic device and assist the user in perceiving the acoustic feedback of the electronic device.

In some embodiments, block 708 can be replaced with one or more of the blocks 504, 506, 508, 510, 512, and 514 in FIG. 5 when an object is detected approaching and/or contacting the input device.

Figure 8:
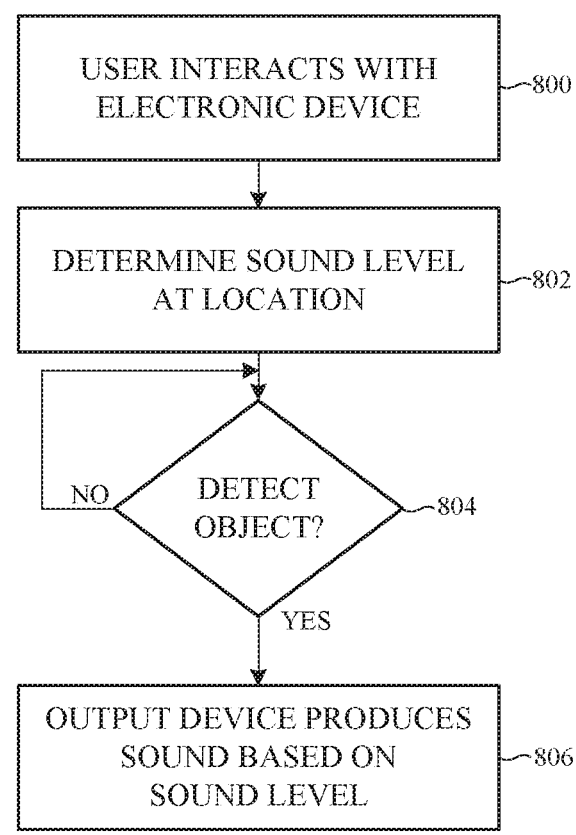
FIG. 8 shows a flowchart of a fifth method of modifying a feedback of an input device.

FIG. 8 shows a flowchart of a fifth method of modifying a feedback of an input device. In some embodiments, the modification of the feedback or the user-perceived feedback of an input device can be based on the ambient sound level of the environment. Different locations can be associated with different ambient sound levels, and these sound levels can affect the feedback or the user-perceived feedback of an electronic device. For example, a coffee shop has different associated sounds compared to a silent conference room or a family room in the user's home.

Initially, a user interacts with an electronic device at block 800. As the user interacts with the electronic device, the ambient sound level may be determined. For example, the ambient sound level can be established based on data from one or more sensors (block 802). For example, a microphone can capture audio of a location and the sound level at the location may be determined. Additionally or alternatively, a sound measurement application running on the electronic device may be used to measure the decibel or noise level at the location.

Next, as shown in block 804, a determination is made as to whether an object (e.g., finger) is detected approaching and/or contacting an input device. If not, the process waits at block 804. When an object is approaching and/or contacting an input device, the method passes to block 806 where, based on the determined sound level, one or more output devices generate acoustic and/or haptic stimuli to modify the feedback or the user-perceived feedback of the input device. In some embodiments, the operation of one or more output devices can be adjusted based on the ambient sound level. For example, when the output device is a speaker, the volume and/or the audio file that is played can be changed based on the ambient sound levels. Alternatively, characteristics of an electric current that is received by an electromagnetic actuator can be modified based on the ambient sound level. Characteristics such as the frequency, timing, amplitude, and/or phase of an electric current can be changed to cause the actuator to produce different acoustic and/or haptic stimuli.

In some embodiments, a haptic stimulus may be increased when the ambient sound level is high. The increased haptic stimulus may be felt by a user and/or produce a sound that is heard by the user. The increased haptic stimulus, along with the noisy environment, can cause the perceived feedback of an input device to remain substantially consistent as perceived by the user. Additionally or alternatively, an acoustic stimulus may be increased when the ambient sound level is high. The increased acoustic stimulus may be heard by the user, which causes the perceived feedback of an input device to remain substantially consistent as perceived by the user.

Alternatively, haptic and/or acoustic stimuli can be decreased when the ambient sound level is low. In some situations, a user may want the feedback of an input device (e.g., the sounds produced by the keys in a keyboard), to be lower in a quieter environment. The decreased haptic and/or acoustic stimuli, along with the quiet environment, can lower or reduce the perceived feedback of the input device.

In some embodiments, block 806 can be replaced with one or more of the blocks 504, 506, 508, 510, 512, and 514 in FIG. 5 when a body part is detected approaching and/or contacting the input device.

Figure 9A:
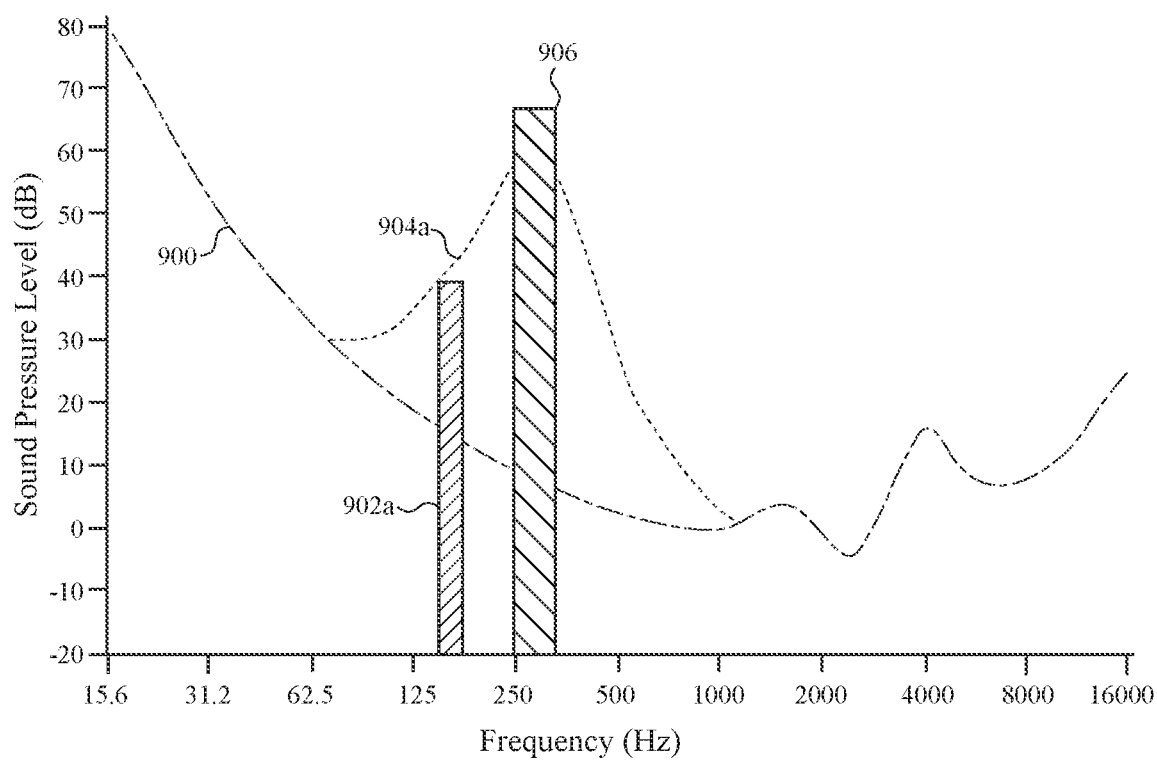
FIGS. 9A-9C show example graphs of a first sound produced by an input device and a second sound produced by an output device that modifies the first sound.
Figure 9B:
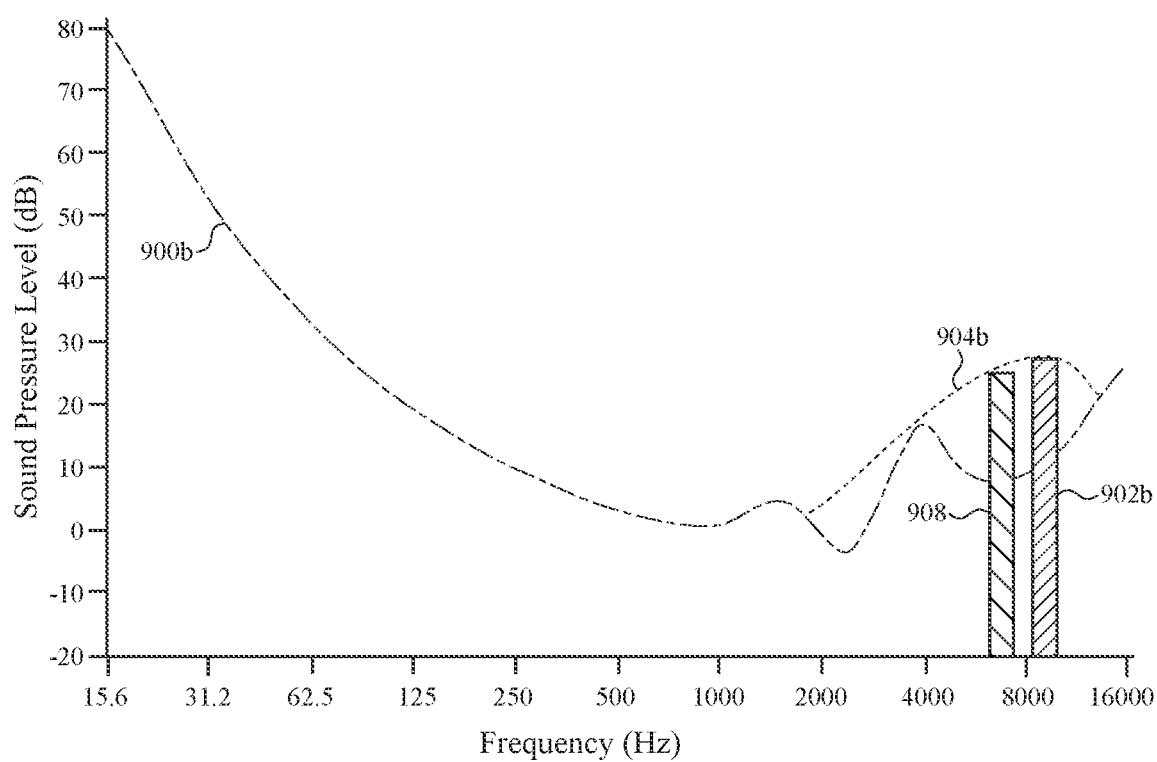
Figure 9C:
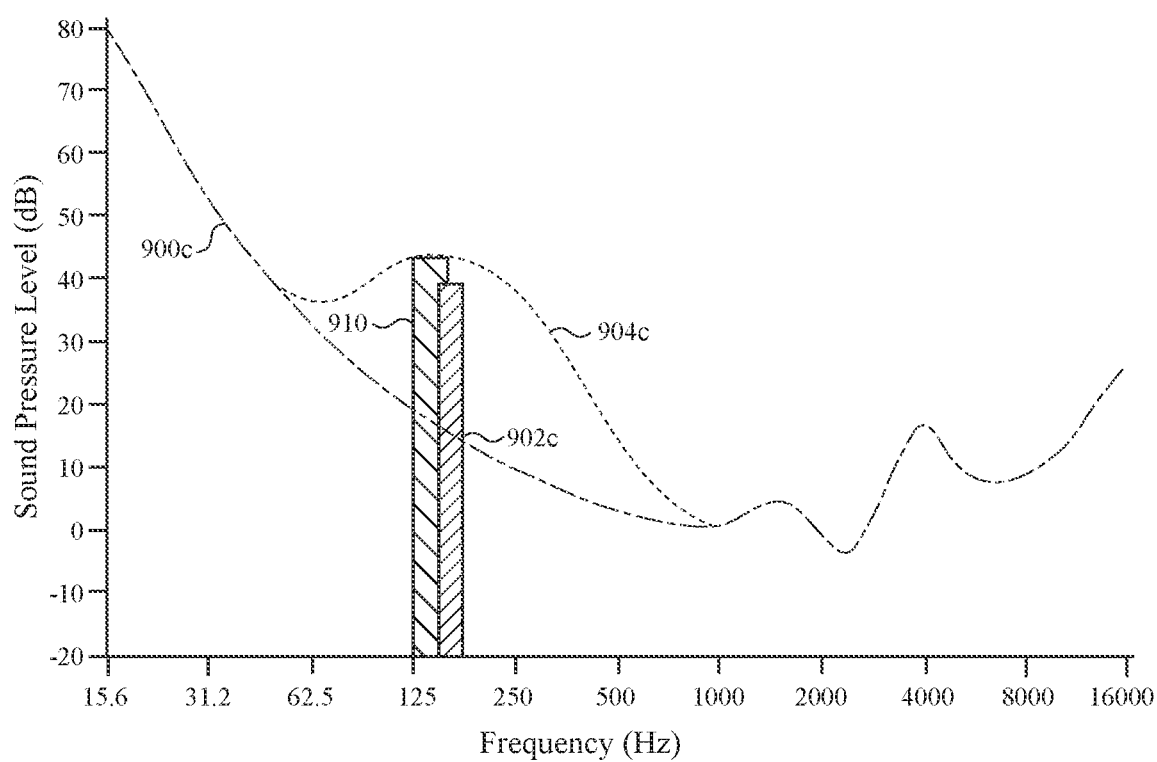

FIGS. 9A-9C show example graphs of a first sound produced by an input device and a second sound produced by an output device that modifies the first sound. The hearing range of humans typically ranges from 20 Hz to 20,000 Hz, although there can be variations between individual persons due to increased age or injury. Additionally, some humans are less able to hear sounds at higher frequencies compared to other humans. Even though individual hearing range varies according to age and the condition of the person's ears and nervous system, humans generally are most sensitive to frequencies between 2,000 and 5,000 Hz. In some embodiments, the acoustic stimuli produced by an output device is closer to the peak sensitivity of human hearing (e.g., between 2,000 and 5,000 Hz) than the inherent acoustic feedback produced by an input device. In some cases, the acoustic stimuli are configured to cause the frequency of the single sound heard by the user to fall within a predicted sensitivity range (e.g., 2,000 to 5,000 Hz).

In other embodiments, the acoustic stimuli produced by an output device is designed to cause the frequency, amplitude, or overall signal output of the combined output to be too low to be perceived by a user. For example, the acoustic stimulus or stimuli produced by one or more output devices may cancel the first sound produced by the input device.

In FIG. 9A, plot 900 represents a threshold sound pressure level in an example environment (e.g., a quiet environment) across the various frequencies. As depicted in FIG. 9A, the perceptibility threshold 900 decreases as the frequency increases up to around 1000 Hz. At that point the perceptibility threshold 900 fluctuates but increases overall as the frequency increases. The one or more sounds (or sound pressure waves) produced by an input device are represented by the bar 902a. At the given frequency, the sound pressure level produced by the input device exceeds the perceptibility threshold 900 at around 15 decibels and reaches a maximum sound pressure level of 40 decibels. Thus, a user can hear the sound(s) generated by the input device.

The plot 904a represents the masking threshold needed to mask or modify the sound(s) 902a. As shown in FIG. 9A, an acoustic output (e.g., sound pressure waves or second sounds) may be produced by an output device at a slightly higher frequency and with a higher sound pressure level (as represented by bar 906). The acoustic output may be generated or configured to mask or obscure the sound(s) generated by the input device. As indicated by the plot 904a, the sound(s) produced by the input device (bar 902a) may have a reduced perceptibility when experienced in combination with the acoustic output (906). FIG. 9A is one example and in other embodiments the acoustic output may be produced at slightly lower frequencies and/or with a higher or lower sound pressure level. And as described earlier, the one or more second sounds can occur prior to, during, and/or after the actuation of an input device.

FIG. 9B illustrates an example plot where the one or more sounds (or sound pressure waves) produced by an input device are represented by the bar 902b and the one or more second sounds (or sound pressure waves) created by at least one output or sound-generating device are represented by the bar 908. As shown in FIG. 9B, the second sound(s) are produced at a lower frequency and with a lower sound pressure level. The second sound(s) (bar 908) can reduce, modify, mask, or obscure the feedback or the user-perceived feedback of the input device as indicated by the plot 904b.

FIG. 9C depicts an example plot where the one or more sounds (or sound pressure waves) produced by an input device are represented by the bar 902c and the one or more second sounds (or sound pressure waves) created by at least one output or sound-generating device are represented by the bar 910. As shown in FIG. 9C, the second sound(s) are produced at a slightly lower frequency and with a higher sound pressure level. In some embodiments, the second sound or sounds can be generated at the same frequency and with the same sound pressure level.

The second sound(s) (bar 910) can reduce, modify, enhance, or obscure the feedback or the user-perceived feedback of the input device (as represented by bar 902c). In some embodiments, the one or more second sounds or sound pressure waves (bar 910) may combine with, or be superimposed on, the first sound(s) or sound pressure wave(s) (bar 902c), which results in the user perceiving the feedback of the input device differently. The first and second sounds (or sound pressure waves) are heard by a user and associated with the input device as feedback when the first and second sounds occur within a given time period of each other. Plot 904c represents the combined feedback or user-perceived feedback.

In other embodiments, the one or more second sounds (or sound pressure waves) produced by the output device(s) cancel the sound(s) (or some of the sound) generated during the actuation of the input device. For example, the undesirable frequencies or sounds produced by an input device during actuation of the input device can be pre-determined. During actuation of the input device, the output device(s) generate one or more sounds that are out of phase with the sounds produced by the input device to attenuate the undesirable sounds in real-time.

Figure 10:
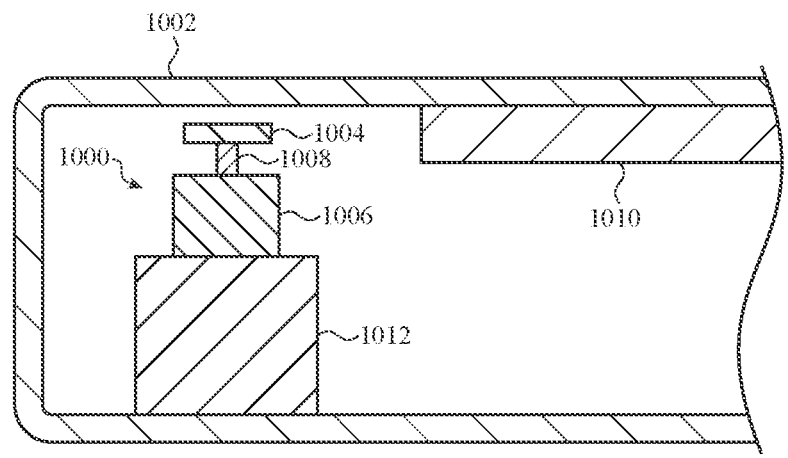
FIGS. 10 and 11 depict example output devices that can be used to produce acoustic and/or haptic stimuli.
Figure 11:
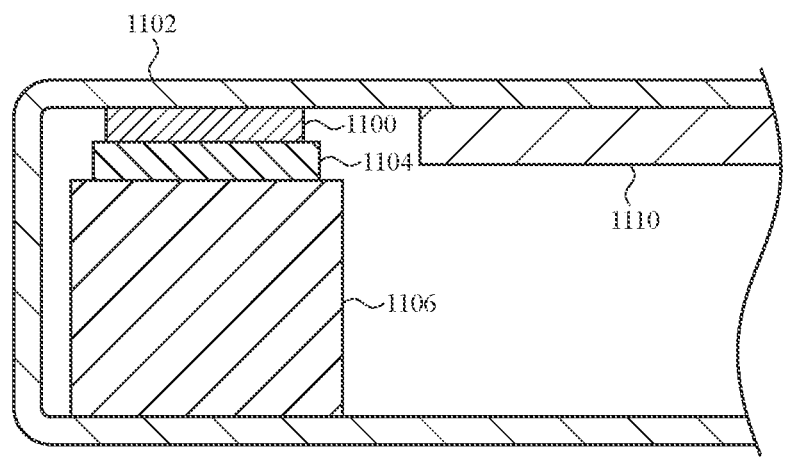

FIGS. 10 and 11 illustrate example output devices that can be used to produce acoustic and/or haptic stimuli. In FIG. 10, the output device includes a haptic device 1000 disposed within a housing 1002 of an electronic device. The haptic device 1000 includes a mass 1004 attached to an electromagnetic actuator 1006 (or other type of actuator) by a rod 1008 or other connection. In this example, the haptic device 1000 is attached or coupled to a support 1012. The haptic device 1000 may be positioned near (e.g., below) an input device 1010. Example input devices include, but are not limited to, a keyboard and a track pad.

Based on the actuation of the input device 1010, the electromagnetic actuator 1006 can be activated or actuated to move the mass 1004 towards the housing 1002. In some cases, a haptic output is produced due to the movement of the mass 1004. In some cases, a haptic output is produced due to an impact between the mass 1004 and the housing 1002. The haptic output produced by the haptic device 1000 may not be directly perceptible by the user. For example, the haptic output, alone and not in combination with another output or stimulus, may not be readily perceptible to the user. This haptic and/or acoustic output can reduce, modify, enhance, or obscure the feedback or the user-perceived feedback of the input device 1010, in accordance with the embodiments described herein.

In FIG. 11, the output device includes a piezoelectric actuator 1100 (example haptic device) attached to, or in contact with, an interior surface of the housing 1102 of an electronic device. In this example, the piezoelectric actuator 1100 is connected to a circuit layer 1104 (e.g., a flexible circuit board). The circuit layer 1104 can be attached to a support structure 1106. The support structure 1106 may be positioned adjacent to an input device 1110. For example, in the illustrated embodiment, the support structure 1106, the circuit layer 1104, and the piezoelectric actuator 1100 are laterally adjacent to the input device 1110. In other words, the support structure 1106, the circuit layer 1104, and the piezoelectric actuator 1100 are coupled to the same surface of the housing 1102.

The circuit layer 1104 is configured to transmit electrical signals to the piezoelectric actuator 1100 to cause the piezoelectric actuator to move or vibrate. Based on the actuation of the input device 1110, the piezoelectric actuator 1100 can be activated (receive electrical signals) to cause the piezoelectric actuator 1100 to move or vibrate. The movement of the piezoelectric actuator 1100 may produce a detectable or non-detectable haptic output. This haptic output can reduce, modify, enhance, or obscure the feedback or the user-perceived feedback of the input device 1110.

Although the embodiments are described herein in conjunction with a trackpad and a keyboard, other embodiments are not limited to these types of input devices. The present invention can be implemented in a variety of user input devices, including, but not limited to, a joystick, an input button, a dial, a mouse, a stylus, a knob, a rotatable steering device, a touchscreen, a rocker switch, scanners or sensors (e.g., fingerprint sensor), and/or a movable selector or switch. When interacting with an input device (e.g., submitting an input that provides data and/or control signals), a user can associate a feedback to the input device that may be based on several factors, such as the force needed to submit an input, the feel of the input device as it responds to the submitted input (e.g., movement), and/or the sound associated with the submitted input. These factors, as well as other possible interactions and sounds, can produce an acoustic response and/or a tactile response that is associated with the input device, which is perceived as feedback by the user. The tactile response can include haptic rendered taps that vary in duration and/or intensity, textures, and/or varying amounts of simulated friction. This user-perceived feedback or output (e.g., acoustic and/or tactile output) may be due to the natural response of the input device. As described with respect to the embodiments described herein, the user's perception of the natural response of the input device may be enhanced, amplified, masked, obscured, or canceled using at least some of the techniques disclosed herein.

For example, in one embodiment, an input device is configured as a stylus or a digital pen. The stylus can be in communication with electronic device through contact (e.g., to a touchscreen), a wired connection, and/or a wireless connection. A user can submit inputs to an electronic device using any suitable technique. Example techniques include, but are not limited to, touching, tapping, and/or pressing the stylus to a surface of the electronic device (e.g., to a touchscreen), pressing a button in the stylus, hovering the stylus over a surface of the electronic device (e.g., over an icon on a touchscreen), and/or by pressing and/or tilting the stylus. A feedback of the stylus can be modified using one or more output or sound-generating devices. An output device can produce acoustic and/or haptic stimuli around the time a user submits an input through the stylus. The output device can create the acoustic and/or haptic stimuli before, during, and/or after the actuation of the input device. The sound or tactile feedback created by the stylus and the acoustic and/or haptic stimuli produced by the output or sound-generating device can be heard and/or felt by a user and perceived as a single feedback event when the individual sound(s) and stimuli occur within a given time period of each other. The acoustic and/or haptic stimuli can reduce, modify, cancel, amplify, enhance, or obscure the user-perceived feedback of the stylus.

In another example, an input device is configured as mouse that is used to control a cursor or movable indicator displayed on a screen. A user can submit inputs to the electronic device by moving the mouse to move the movable indicator to a graphical element (e.g., an icon) displayed on the screen and pressing a button on the mouse, applying a force or pressure to a particular region of the mouse surface, and/or by hovering the movable indicator over the graphical element. The feedback of the mouse can be based on the sounds and/or the tactile feedback of the mouse as the mouse is moved across a surface, the force needed to press the button or apply a force to a particular region of the mouse, and/or the response of the mouse to the pressure or force. The acoustic and/or tactile user-perceived feedback may be modified using one or more output or sound-generating devices. An output device can produce acoustic and/or haptic stimuli around the time a user submits an input with the mouse. The sound or tactile feedback created by the mouse and the acoustic and/or haptic stimuli produced by the output device can be heard and/or felt by a user and perceived as a single feedback event when the individual sound(s) and stimuli occur within a given time period of each other. The acoustic and/or haptic stimuli can reduce, modify, cancel, enhance, amplify, or obscure the user-perceived feedback of the mouse.

Figure 12:
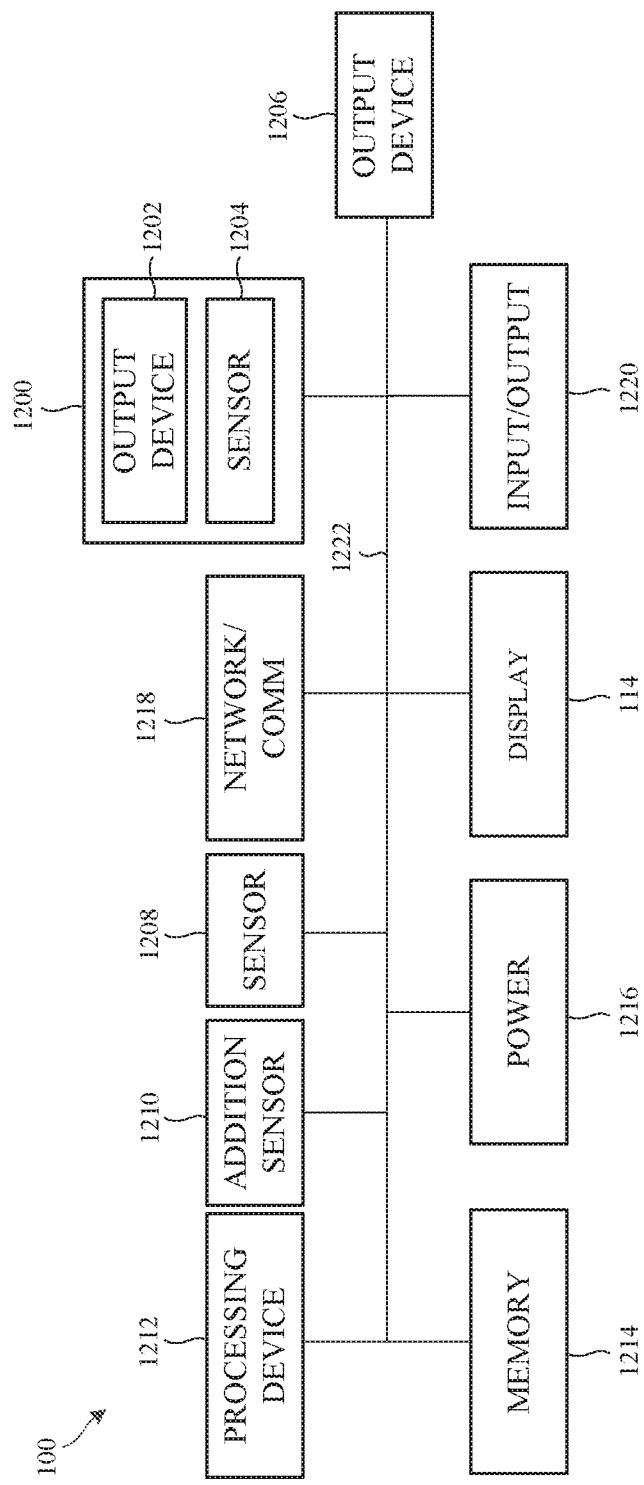
FIG. 12 shows an example block diagram of the electronic device shown in FIG. 1.

FIG. 12 depicts an example block diagram of the electronic device shown in FIG. 1. As discussed earlier, the electronic device 100 includes an input device 1200 having an associated feedback or user-perceived feedback. In some embodiments, the input device 1200 may include one or more output devices 1202 configured to modify the feedback or user-perceived feedback. In particular, each output device 1202 is a sound-generating device that produces one or more sounds to modify the feedback or user-perceived feedback. In one non-limiting example, the output device may be a speaker that produces an acoustic output (e.g., plays an audio file). In another non-limiting example, the output device may be an electromagnetic or mechanical actuator that produces an acoustic output based on movement of a mass, or based on operation of a component (e.g., motor).

As another example, the output device can be a material that responds to an input signal or an environmental input. For example, a piezo material can constrict or move in response to an applied electrical signal (see FIG. 11). Alternatively, a material can thermally expand in response to applied heat (environmental input). When the material expands, the material can impact a component in the electronic device to produce one or more sounds.

Additionally or alternatively, the input device 1200 may include one or more sensors 1204. Each sensor 1204 is configured to detect an approaching body part (e.g., finger) or an actuation of the input device 1200. For example, a sensor 1204 can detect the motion of a key in a keyboard (e.g., key 106) when the key is depressed. Alternatively, a sensor 1204 may detect the proximity of a finger to the input device 1200 and/or the finger contacting the input device 1200.

In some embodiments, the electronic device 100 can include one or more output devices 1206 that are separate from the input device 1200. Like the output device(s) 1202, the one or more output devices 1206 are configured to modify the feedback or the user-perceived feedback. In particular, each output device 1202 is a sound-generating device that produces one or more sounds to modify the feedback or the user-perceived feedback.

As one example, an output or sound-generating device is an acoustic device such as a speaker that outputs audio or other acoustic output around the time the input device is actuated. As discussed earlier, the acoustic output can be output before, during, and/or after actuation of the input device. The acoustic output precedes, follows, or combines with the acoustic and/or tactile response(s) of the input device to modify, enhance, obscure, or cancel a feedback or a user-perceived feedback of the input device.

In another example, the output device is an actuator that produces haptic output based on the actuation of the input device (see FIG. 10). The haptic output may be movement, a force, and/or a vibration. The actuator can create one or more sounds while producing the movement, force, and/or vibrations. In some embodiments, the user is not able to detect the movement, force and/or vibrations, but the sound(s) produced by the movement, force, and/or vibrations can be heard by the user. In other embodiments, the user is able to detect the movement, force, and/or vibrations, and this output modifies the perceived tactile feedback of the input device. The generated acoustic and/or haptic stimulus or stimuli combines or interacts with the acoustic and/or tactile response(s) of the input device to modify, enhance, obscure, or cancel a feedback or a user-perceived feedback of the input device.

In some embodiments, the output device is an electromagnetic actuator. The electromagnetic actuator can move a mass (e.g., a magnet) based on an electromagnetic field that is produced when an electrical signal passes through a conductor. The movement of the mass can produce one or more sounds. For example, the moving mass can produce sounds as the moving mass moves or slides in one or more directions. Additionally, the moving mass may generate sounds when the moving mass strikes or impacts a housing or a frame that is positioned adjacent to the moving mass. Characteristics of an electric current that is received by an electromagnetic actuator can be modified to cause the actuator to produce different sounds. For example, the frequency, amplitude, and/or phase of the electric current can change to produce different acoustic and/or haptic stimuli.

In some embodiments, the actuator can be a piezoelectric actuator that is used to produce movement in a component in the electronic device. The movement of the component may produce one or more sounds that combine or interact with the sound(s) produced by an input device during actuation of the input device. The sound(s) generated by the output device modify, enhance, obscure, or cancel the feedback or the user-perceived feedback of the input device.

In some embodiments, the actuator(s) may create a tactile or haptic output that is or is not detectable by the user. The sound(s) and/or the haptic output can combine with the acoustic and/or tactile response of the keys 304 and/or the track pad 306 to modify, enhance, obscure, or cancel the feedback or the user-perceived feedback of the input device.

Additionally or alternatively, the electronic device 100 can include one or more sensors 1208 that are separate from the input device 1200. Like the sensor(s) 1204, at least one sensor 1208 is configured to detect an approaching body part (e.g., finger) or the actuation of the input device 1200. As described earlier, the sensor(s) 1208 may be positioned substantially anywhere on the electronic device 100. Example sensors include, but are not limited to, an image sensor, a temperature sensor, a light sensor, a proximity sensor, a touch sensor, a force sensor, and an accelerometer.

In some embodiments, additional sensor(s) 1210 can be positioned substantially anywhere on the electronic device 100. The additional sensors 1210 may be configured to sense substantially any type of characteristic, such as, but not limited to, images, pressure, light, touch, force, biometric data, temperature, position, location, motion, and so on. For example, the sensor(s) 1210 may be an image sensor, a temperature sensor, a light sensor, an atmospheric pressure sensor, a proximity sensor, a humidity sensor, a magnet, a gyroscope, a biometric sensor, an accelerometer, a navigation sensor, and so on. In some embodiments, some or all of the sensors 1208 and the additional sensors 1210 can be used for multiple purposes. In other words, some or all of the sensors 1210 can be used to detect an approaching body part (e.g., finger) or the actuation of the input device 1200.

Additionally or alternatively, some or all of the sensors 1208 may be used for functions or applications other than the detection of an approaching body part (e.g., finger) or the actuation of the input device 1200.

The electronic device 100 may further include the display 114, one or more processing devices 1212, memory 1214, a power source 1216, one or more input/output (I/O) devices 1220, and a network communications interface 1218. The processing device(s) 1212 can control or coordinate some or all of the operations of the electronic device 100. The processing device(s) 1212 can communicate, either directly or indirectly, with substantially all of the components of the electronic device 100. For example, a system bus or signal line 1222 or other communication mechanism can provide communication between the input device 1200, the output device(s) 1202 and/or 1206, the sensor(s) 1204, 1208, and/or 1210, the processing device(s) 1212, the memory 1214, the power source 1216, the I/O device(s) 1220, and/or the network communications interface 1218. The one or more processing devices 1212 can be implemented as any electronic device capable of processing, receiving, or transmitting data or instructions. For example, the processing device(s) 1212 can each be a microprocessor, a central processing unit (CPU), an application-specific integrated circuit (ASIC), a digital signal processor (DSP), or combinations of such devices. As described herein, the term "processing device" is meant to encompass a single processor or processing unit, multiple processors, multiple processing units, or other suitably configured computing element or elements.

The memory 1214 can store electronic data that can be used by the electronic device 100. For example, the memory 1214 can store electrical data or content such as, for example, audio and video files, documents and applications, device settings and user preferences, timing and control signals, data structures or databases, one or more input device profiles, and so on. The memory 1214 can be configured as any type of memory. By way of example only, the memory can be implemented as random access memory, read-only memory, Flash memory, removable memory, or other types of storage elements, or combinations of such devices.

The power source 1216 can be implemented with one or more devices capable of providing energy to the electronic device 100. For example, the power source 1216 can be one or more batteries or rechargeable batteries. Additionally or alternatively, the power source 1216 may be a connection cable that connects the electronic device to another power source, such as a wall outlet or another electronic device.

The network communication interface 1218 can facilitate transmission of data to or from other electronic devices. For example, a network communication interface can transmit electronic signals via a wireless and/or wired network connection. Examples of wireless and wired network connections include, but are not limited to, cellular, Wi-Fi, Bluetooth, infrared, and Ethernet.

The one or more I/O devices 1220 can transmit and/or receive data to and from a user or another electronic device. The I/O device(s) 1220 can include a touch sensing input surface such as a track pad, one or more buttons, one or more microphones or speakers, one or more ports such as a microphone port, and/or a keyboard.

It should be noted that FIG. 12 is provided by way of example only. In other examples, the electronic device may include fewer or more components than those shown in FIG. 12. Additionally or alternatively, the electronic device can be included in a system and one or more components shown in FIG. 12 may be separate from the electronic device but in communication with the electronic device. For example, an electronic device may be operatively connected to, or in communication with a separate display. As another example, one or more applications or data can be stored in a memory separate from the electronic device. In some embodiments, the separate memory can be in a cloud-based system or in an associated electronic device.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A keyboard, comprising:
   a key configured to actuate in response to a key press, the key including a key stack, comprising:
      a key cap;
      a key mechanism coupled to the key cap and configured to move the key cap between a rest position and a depressed position in response to the key press; and
      a switch positioned beneath the key cap and configured to be activated in response to the key press; and
   an output device configured to produce a feedback output comprising at least one of an acoustic output or a haptic output that is initiated in advance of the activation of the switch, wherein:
      the key stack is configured to produce at least one of a sound or a tactile response as the key actuates; and
      the feedback output combines with the at least one of the sound or the tactile response produced by the key stack to produce a single feedback stimulus.

2. The keyboard of claim 1, wherein:
   the key stack is configured to produce the sound;
   the feedback output is the acoustic output; and
   the acoustic output combines with the sound produced by the key stack to produce the single feedback stimulus, which includes a user-perceived single audio feedback event.

3. The keyboard of claim 2, wherein the acoustic output reduces a perceptibility of the sound produced by the key stack.

4. The keyboard of claim 1, wherein:
   the key stack is configured to produce the tactile response;
   the feedback output is the haptic output; and
   the haptic output combines with the tactile response produced by the key stack to produce the single feedback stimulus.

5. The keyboard of claim 1, wherein the at least one of the sound or the tactile response is produced, at least in part, by the key mechanism.

6. The keyboard of claim 1, wherein the at least one of the sound or the tactile response is produced by components of the key stack interacting with one another.

7. An electronic device comprising:
   a processing device;
   a keyboard operably coupled to the processing device and comprising a key stack, the key stack comprising:
      a key cap;
      a key mechanism configured to actuate the key cap between a rest position and a depressed position in response to receiving a user input; and
      a switch beneath the key cap and configured to be activated when the key mechanism is in the depressed position; and
   an output device; wherein:
      the key stack is configured to produce at least one of a sound or a tactile response that is initiated prior to the activation of the switch;
      the processing device is configured to determine at least one of an acoustic output or a haptic output that, when combined with the at least one of the sound or the tactile response, produces a single feedback event; and
      the output device is configured to produce the at least one of the acoustic output or the haptic output in response to the user input to produce the single feedback event.

8. The electronic device of claim 7, wherein:
   the key stack is configured to produce the sound; and
   the output device is configured to produce the acoustic output to produce the single feedback event.

9. The electronic device of claim 8, wherein:
   the acoustic output has an amplitude greater than the sound; and
   the acoustic output has a frequency that is between 2000 Hz and 5000 Hz.

10. The electronic device of claim 7, wherein the at least one of the sound or the tactile response is produced, at least in part, by the key mechanism.

11. The electronic device of claim 7, wherein the at least one of the sound or the tactile response and the at least one of the acoustic output or the haptic output occur simultaneously.

12. An electronic device, comprising:
   an input device having a movable key that is configured to actuate between a first position and a second position in response to a user input, the movable key comprising a key stack configured to produce a first sound as the movable key actuates, the key stack comprising:
      a key cap;
      a key mechanism coupled to the key cap; and
      a switch beneath the key cap and configured to be activated when the movable key is in the second position; and
   an output device configured to initiate a second sound prior to the movable key reaching the second position, wherein the second sound, combined with the first sound, results in a single feedback stimulus that is perceptible to a user.

13. The electronic device of claim 12, wherein the second sound enhances a perceptibility of the first sound.

14. The electronic device of claim 12, wherein the second sound reduces a perceptibility of the first sound.

15. A method for operating an electronic device, the method comprising:
   receiving typing activity at a keyboard of the electronic device;
   determining an identity of a user of the electronic device based on characteristics of the typing activity received at the keyboard, the characteristics comprising one or more of typing speed, force applied to the keyboard, or pauses between inputs;
   retrieving an input device profile associated with the user in response to determining the identity of the user;

receiving a key press at the keyboard resulting in an activation of a key switch, the key press causing a key stack of the keyboard to produce a sound;

determining, using the input device profile, an acoustic output that modifies the sound to produce a single feedback stimulus when combined with the sound produced by the keyboard a; and prior to the activation of the key switch, producing the acoustic output using an audio output device.

16. The method of claim 15, wherein the acoustic output is completed before the activation of the key switch.

17. The method of claim 15, wherein:

the sound is produced, at least in part, by a key mechanism of the key stack; and the acoustic output is produced by a speaker of the electronic device.

18. A method for operating an electronic device, comprising:

determining that an audio output device is operably connected to the electronic device;

retrieving an input-device profile associated with the audio output device, the input-device profile specifying a feedback output for modifying at least one of a sound or a tactile response produced by a key stack of a keyboard of the electronic device;

receiving a key press at the keyboard resulting in an actuation of a switch, the key press causing the key stack of the keyboard to produce the at least one of the sound or the tactile response as the key stack actuates; and based on the input-device profile, initiating an output that corresponds to the feedback output, the output being initiated prior to the actuation of the switch and combining with the at least one of the sound or the tactile response to produce a single feedback stimulus.

19. The method of claim 18, wherein:

the key stack produces the sound; and the feedback output is an acoustic output selected to modify the sound to produce the single feedback stimulus.

20. The method of claim 18, wherein:

the key stack produces the tactile response; and the feedback output is a haptic output selected to modify the tactile response to produce the single feedback stimulus.

* * * * *